(12) United States Patent
Sue

(10) Patent No.: US 10,728,505 B2
(45) Date of Patent: Jul. 28, 2020

(54) MONITORING SYSTEM

(71) Applicant: DENSO WAVE INCORPORATED, Chita-gun, Aichi-pref. (JP)

(72) Inventor: Shunsuke Sue, Chita-gun (JP)

(73) Assignee: DENSO WAVE INCORPORATED, Chita-Gun, Aichi-Pref. (JP)

( * ) Notice: Subject to any disclaimer, the term of this patent is extended or adjusted under 35 U.S.C. 154(b) by 0 days.

(21) Appl. No.: 16/434,394

(22) Filed: Jun. 7, 2019

(65) Prior Publication Data

US 2019/0387203 A1    Dec. 19, 2019

(30) Foreign Application Priority Data

Jun. 15, 2018 (JP) .................................. 2018-114587

(51) Int. Cl.
| | | |
|---|---|---|
| *H04N 9/80* | (2006.01) | |
| *H04N 7/18* | (2006.01) | |
| *G05D 1/00* | (2006.01) | |
| *G05B 23/02* | (2006.01) | |
| *G06F 16/70* | (2019.01) | |

(52) U.S. Cl.
CPC ......... *H04N 7/185* (2013.01); *G05B 23/0208* (2013.01); *G05D 1/0011* (2013.01); *G05D 1/0088* (2013.01); *G06F 16/70* (2019.01); *G05D 2201/0217* (2013.01)

(58) Field of Classification Search
USPC ................................................. 386/241, 248
See application file for complete search history.

(56) References Cited

U.S. PATENT DOCUMENTS

| | | | | |
|---|---|---|---|---|
| 10,255,670 | B1* | 4/2019 | Wu ...................... | H04N 5/2252 |
| 2004/0113770 | A1* | 6/2004 | Falk .................. | G08B 13/19645 |
| | | | | 340/531 |
| 2005/0096790 | A1* | 5/2005 | Tamura .................. | G06N 3/008 |
| | | | | 700/245 |
| 2006/0149824 | A1* | 7/2006 | Park ........................ | H04L 69/26 |
| | | | | 709/206 |
| 2011/0030016 | A1* | 2/2011 | Pino, Jr. .............. | H04L 12/2818 |
| | | | | 725/80 |
| 2012/0265391 | A1* | 10/2012 | Letsky ................. | A01D 34/008 |
| | | | | 701/25 |

(Continued)

FOREIGN PATENT DOCUMENTS

| | | |
|---|---|---|
| JP | 2009-181270 A | 8/2009 |
| JP | 2014-146288 A | 8/2014 |

*Primary Examiner* — Nigar Chowdhury
(74) *Attorney, Agent, or Firm* — Harness, Dickey & Pierce, P.L.C.

(57) ABSTRACT

A monitoring system includes: a monitoring sensor; a mobile robot configured to switch between an autonomous movement mode and a remote control mode; a monitoring terminal; and a system control apparatus configured to switch between the autonomous movement mode and the remote control mode of the mobile robot based on an alarm activation and to determine a manner of a video to be displayed on a display device. In response to a detection of the alarm activation of the monitoring sensor, the system control apparatus permits the display device to display a video in the security priority area in an unprocessed manner and inhibits the display device from displaying a video in the privacy priority area in the unprocessed manner.

5 Claims, 14 Drawing Sheets

(56) References Cited

U.S. PATENT DOCUMENTS

| | | | |
|---|---|---|---|
| 2015/0170509 A1* | 6/2015 | Artes | G05D 1/0274 |
| | | | 340/501 |
| 2016/0188977 A1* | 6/2016 | Kearns | G06K 9/00664 |
| | | | 348/113 |
| 2017/0203446 A1* | 7/2017 | Dooley | B25J 19/023 |
| 2018/0050634 A1* | 2/2018 | White | A47L 9/106 |
| 2019/0086903 A1* | 3/2019 | Ochiai | G05B 23/0208 |

* cited by examiner

FIG. 3

| MONITORING AREA | AREA SETTING | UNPROCESSED VIDEO DISPLAY |
|---|---|---|
| ENTRANCE | SECURITY PRIORITY | PERMISSION |
| CORRIDOR | SECURITY PRIORITY | PERMISSION |
| BEDROOM | SECURITY PRIORITY | PERMISSION |
| LIVING ROOM | SECURITY PRIORITY | PERMISSION |
| CLOSET | SECURITY PRIORITY | PERMISSION |
| DRESSING ROOM | PRIVACY PRIORITY | INHIBITION |
| BATHROOM | PRIVACY PRIORITY | INHIBITION |

MONITORING SYSTEM

CROSS REFERENCE TO RELATED APPLICATIONS

The present application claims the benefit of priority from Japanese Patent Application No. 2018-114587 filed on Jun. 15, 2018. The entire disclosures of all of the above applications are incorporated herein by reference.

TECHNICAL FIELD

The present disclosure relates to a monitoring system.

BACKGROUND

A system is considered in which a security sensor is installed in a room serving as a monitoring area and when the security sensor detects an abnormality, a mobile robot including a camera is rushed to a location where the abnormality occurs. When the security sensor detects an abnormality in such a system, the mobile robot captures an image of the surroundings with a camera. The captured video is transmitted to a surveillance staff located away from the scene through a network line or the like. Thus, despite being in a place away from the scene, the surveillance staff can check the condition of the scene where the abnormality is detected by checking the video captured by the camera.

SUMMARY

The present disclosure provides a monitoring system comprising: a monitoring sensor; a mobile robot that includes a camera and is configured to switch between an autonomous movement mode and a remote control mode; a monitoring terminal; and a system control apparatus that is configured to switch between the autonomous movement mode and the remote control mode of the mobile robot based on an alarm activation of the monitoring sensor and that is configured to determine a manner of a video to be displayed on the display device.

BRIEF DESCRIPTION OF THE DRAWINGS

The above and other objects, features, and advantages of the present disclosure will become more apparent from the following detailed description with reference to the accompanying drawings. In the drawings:

FIG. 3 is a diagram illustrating an example of setting of a monitoring area and permission or inhibition of display of an unprocessed video in the monitoring system according to the first embodiment;

DETAILED DESCRIPTION

Figure 1:
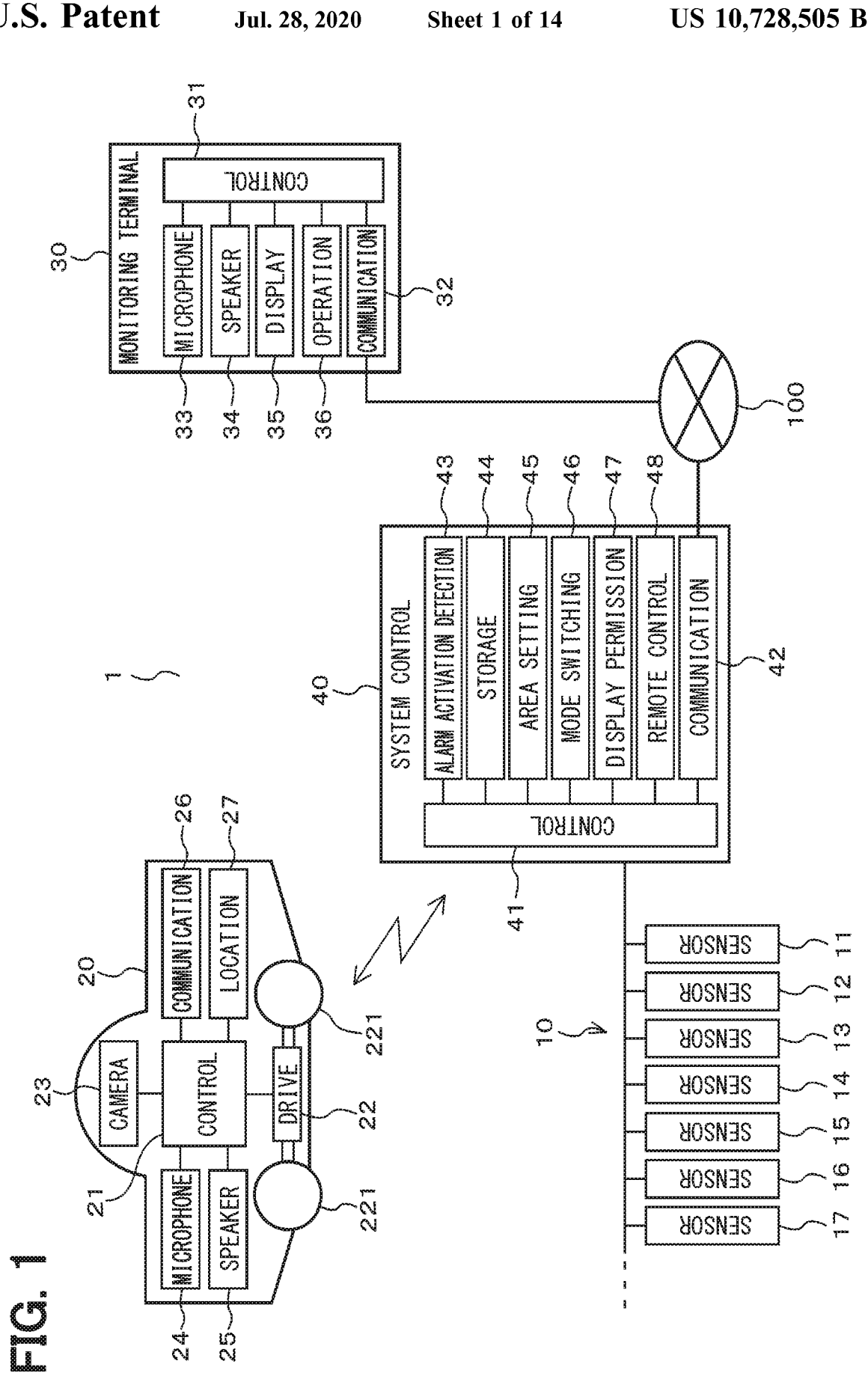
FIG. 1 is a block diagram conceptually illustrating an example of an electrical configuration of a monitoring system according to a first embodiment.

The inventor of the present application has found the following. When a monitoring system is introduced into a home, it is necessary to be careful to invade on the privacy of the user as little as possible, such as preventing the user's life from being peeped at. However, in a conventional monitoring system, the privacy of the user may not be considered. For example, when a mobile robot is rushed to the scene where an abnormality is detected, even the area that the user does not desire to let others photograph is photographed, so that the privacy of the user may leak out to, for example, a surveillance staff operating the mobile robot or the like.

The present disclosure provides a monitoring system that enable to achieve both security improvement and privacy protection in a system that performs monitoring with a mobile robot equipped with a camera.

According to one aspect of the present disclosure, a monitoring system may include a monitoring sensor, a mobile robot, a monitoring terminal, and a system control apparatus. The monitoring sensor is installed in each of multiple monitoring areas. The mobile robot includes a camera that is configured to capture a video around the mobile robot, and is configured to switch between an autonomous movement mode capable of autonomously moving among the monitoring areas and a remote control mode capable of moving by remote control from an outside. The monitoring terminal includes a display device configured to display a video captured by the camera of the mobile robot, and an operation portion used for remote control of the mobile robot when the mobile robot is in the remote control mode. The system control apparatus is configured to switch between the autonomous movement mode and the remote control mode of the mobile robot based on the alarm activation from the monitoring sensor, and determines a manner of the video to be displayed on the display device. The system control apparatus sets in advance a security priority area and a privacy priority area to the monitoring area, and when the system control apparatus detects an alarm activation of the monitoring sensor, the system control apparatus permits a video in the security priority area to be displayed on the display device with the video unprocessed and inhibits a video in the privacy priority area from being displayed on the display device with the video unprocessed.

According to the configuration of the present disclosure, when the monitoring sensor detects an abnormality, it may be possible for the surveillance staff to remotely operate the mobile robot in the security priority area and see, in real time, the unprocessed video in the security priority area captured by the camera of the mobile robot. Therefore, it may be possible for the surveillance staff to grasp the current situation in the security priority area quickly and accurately, and to quickly take necessary measures such as causing a coping staff to head toward the scene. Thus, it may be possible to improve the security in the security priority area.

The privacy priority area is an area where it is necessary to emphasize the privacy of the user residing in the monitoring area. According to the present configuration, even when the monitoring sensor detects an abnormality, the surveillance staff cannot remotely operate the mobile robot in the privacy priority area and cannot see, in real time, the unprocessed video in the privacy priority area captured by the camera. Thus, the privacy in the privacy priority area is protected. As described above, according to the monitoring system of the present configuration, it may be possible to achieve both security improvement and privacy protection in the monitoring area.

Furthermore, according to the present disclosure, in the monitoring system, in a case where the mobile robot stays outside the privacy priority area when the system control apparatus detects alarm activation of the monitoring sensor, the system control apparatus may permit the mobile robot to switch to the remote control mode and may permit the display device to display the video captured by the camera in an unprocessed manner. In a case where the mobile robot stays in the privacy priority area when the system control apparatus detects alarm activation of the monitoring sensor, the system control apparatus may cause the mobile robot to autonomously move outside of the privacy priority area in a state of inhibiting the display device from displaying a video captured by the camera in an unprocessed manner, and then may permit the mobile robot to switch to the remote control mode.

According to this configuration, even in a case where the mobile robot stays in the privacy priority area when the monitoring sensor detects an abnormality and activates an alarm, the mobile robot automatically moves to the security priority area where remote control by the surveillance staff is allowed without the operation of the surveillance staff. At this time, the video in the privacy priority area is not displayed on the display device, so that the video in the privacy priority area is prevented from being viewed by the surveillance staff. As a result, it may be possible to further improve the operability of the mobile robot by the surveillance staff. It may be possible to improve the privacy protection of the user.

Furthermore, according to the present disclosure, in the monitoring system, when the mobile robot is in the remote control mode, the system control apparatus may inhibit a video about the inside of the privacy priority area from being displayed on the display device in an unprocessed manner by not accepting the operation of turning the camera to a direction in which the privacy priority area enters a shooting range of the camera.

According to this configuration, even when the mobile robot is in the remote control mode, the camera of the mobile robot cannot physically capture the inside of the privacy priority area. Therefore, it may be possible to more reliably prevent the video in the privacy priority area from being viewed by the surveillance staff. As a result, it may be possible to more reliably protect the privacy of the user.

Furthermore, according to the present disclosure, in the monitoring system, when detecting alarm activation of the monitoring sensor, the system control apparatus may cause the mobile robot to autonomously move to the monitoring area where the monitoring sensor whose alarm activation is detected is installed, and then may allow the mobile robot to switch to the remote control mode and may permit a video captured by the camera to be displayed on the display device in an unprocessed manner.

According to this configuration, since the mobile robot automatically moves to the scene where the abnormality is detected, there is no need for the surveillance staff to perform remote control when causing the mobile robot to head toward the scene. Therefore, the botheration due to the remote control is reduced. The convenience is improved. In addition, when causing the mobile robot to head toward the scene of the alarm activation, if the surveillance staff performs remote control, the surveillance staff may dither over the route and it may take time for the mobile robot to arrive at the scene. On the other hand, according to the present embodiment, since the mobile robot rushes to the scene where the abnormality is automatically detected, the mobile robot can arrive at the scene immediately after the alarm activation of the monitoring sensor is detected. Therefore, it may be possible for the surveillance staff to quickly check the situation at the scene. As a result, it may be possible to further improve security in the monitoring area, Furthermore, according to this configuration, even when there is a privacy priority area in the middle of the route in which the mobile robot heads toward the alarm activation scene of the monitoring sensor, the surveillance staff cannot remotely control the mobile robot until the mobile robot passes the privacy priority area and arrives at the alarm activation scene. In addition, in this case, since the video in the privacy priority area is not displayed on the display device of the monitoring terminal, the surveillance staff cannot see the unprocessed video in the privacy priority area captured by the camera in real time. Thus, the video in the privacy priority area is prevented from being seen by the surveillance staff. As described above, also according to the present embodiment, it is possible to achieve both security improvement and privacy protection in the monitoring area.

Furthermore, according to the present disclosure, in the monitoring system, when the privacy priority area appears in a video captured by the camera, the system control apparatus may cause the display device to display a processed video subjected to such video processing that at least an individual of a person appearing in the video cannot be identified.

According to this configuration, when remotely operating the mobile robot, the surveillance staff can remotely operate the mobile robot while grasping the situation around the mobile robot by seeing the video displayed on the display device of the monitoring terminal, but cannot identify an individual of a person staying in the privacy priority area. Therefore, the operability of the mobile robot by the surveillance staff is improved. It may be possible to improve the security in the monitoring area. It may be possible to protect the privacy of the user.

Hereinafter, multiple embodiments will be described with reference to the drawings. It should be noted that in each embodiment, substantially the same components are denoted by the same reference numerals and descriptions thereof will be omitted.

First Embodiment

In the following, the first embodiment will be described with reference to FIG. 1 to FIG. 6.

Figure 2:
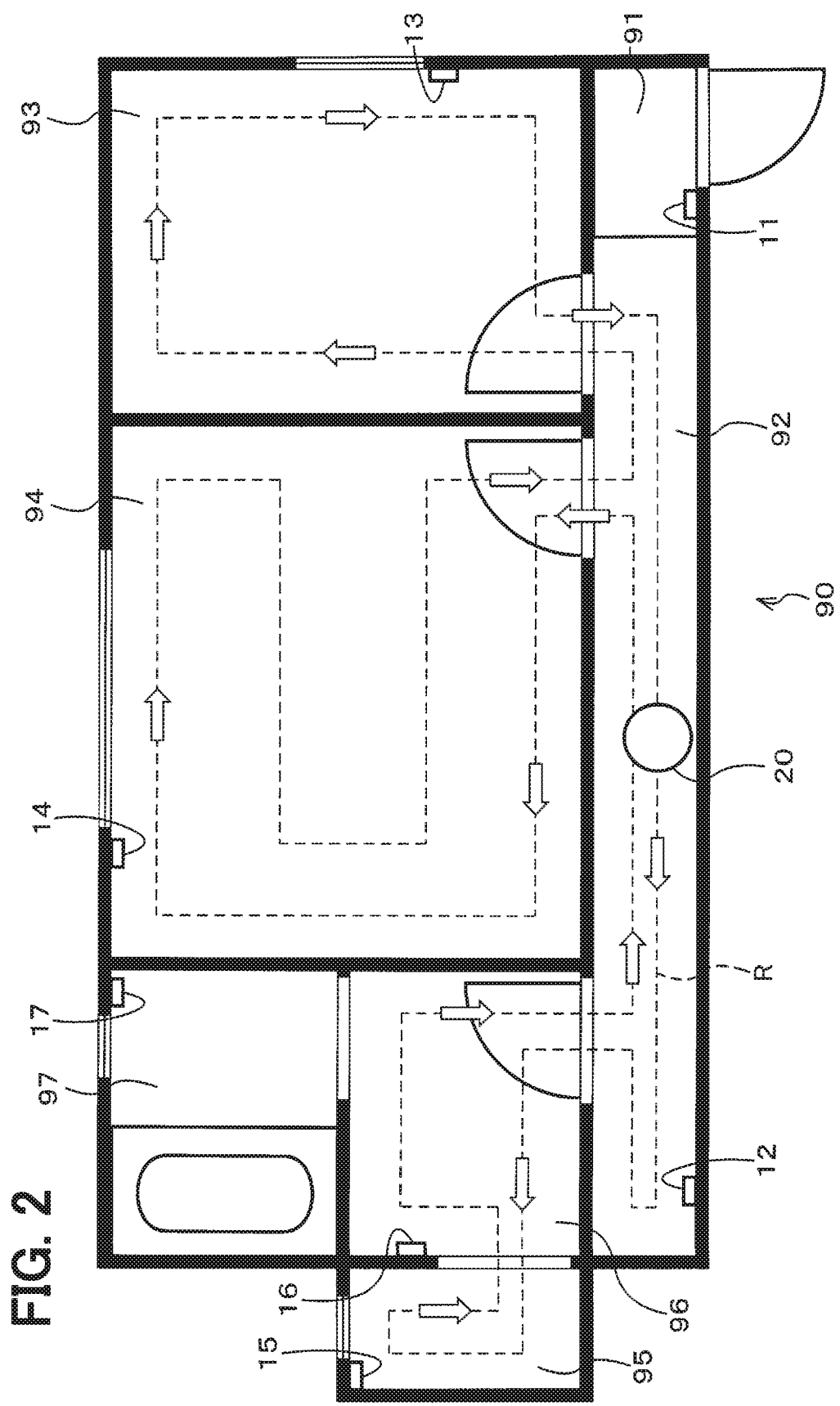
FIG. 2 is a diagram illustrating an example of a monitoring area and a patrol route of the monitoring system according to the first embodiment.

A monitoring system 1 illustrated in FIG. 1 is applied to a building where it is necessary to emphasize also privacy while improving security, such as a nursing home, a hospital, and a general house. In the monitoring system 1 of the present embodiment, a general house 90 as illustrated in, for example, FIG. 2 is set to be a monitoring target. In this case, the house 90 includes an entrance 91, a corridor 92, a bedroom 93, a living room 94, a closet 95, a dressing room 96, and a bathroom 97. Then, the monitoring system 1 sets each of the areas 91 to 97 of the house 90 as a monitoring area.

As illustrated in FIG. 1, the monitoring system 1 includes multiple monitoring sensors 10, a mobile robot 20, a monitoring terminal 30, and a system control apparatus 40. The respective monitoring sensors 10, the mobile robot 20, and the monitoring terminal 30 are communicably connected to the system control apparatus 40 by wire or wireless. In this case, the monitoring sensors 10 and the system control apparatus 40 are connected by, for example, wire or wireless. In addition, the mobile robot 20 and the system control apparatus 40 are communicably connected by wireless.

The monitoring sensors 10, the mobile robot 20, and the system control apparatus 40 are installed in a building having a monitoring area 90, and constitute a local area network. In addition, the monitoring terminal 30 and the system control apparatus 40 are communicably connected via a telecommunication line 100 such as an Internet line or a telephone line. Hereinafter, each component of the monitoring system 1 will be described with reference to FIG. 1 to FIG. 3.

(Monitoring Sensor)

The monitoring sensors 10 are placed at the respective monitoring areas 91 to 97 illustrated in FIG. 2, and detect an abnormality occurring in the corresponding areas. It should be noted that in the following description, when the respective monitoring sensors 10 provided in the monitoring areas 91 to 97 are distinguished from one another, they are referred to as monitoring sensors 11 to 17 as illustrated in FIG. 2. The monitoring sensors 10 may adopt various sensors such as a motion sensor for detecting human intrusion, an opening and closing sensor for detecting the opening and closing of the door, an impact sensor for detecting impact or the like, a noise sensor for detecting noise, an offensive smell sensor for detecting offensive smell due to gas leak or the like, a water leakage sensor for detecting water leakage, and a temperature sensor for detecting an abnormality of room temperature. It should be noted that a detection object and a detection system of the monitoring sensors 10 are not limited to those described above, and may be selected appropriately according to the content of monitoring. Each of the monitoring areas 91 to 97 is provided with at least one monitoring sensor 10. Then, when detecting an abnormality, each monitoring sensor 10 transmits an abnormality signal indicating that the abnormality is detected to the system control apparatus 40.

(Mobile Robot)

The mobile robot 20 is a robot that is capable of moving autonomously, such as patrolling inside the facility or house to be monitored. In addition, the mobile robot 20 is a robot that is capable of moving by remote control from the monitoring terminal 30 or the like if needed. As illustrated in FIG. 1, the mobile robot 20 includes a robot controller 21, a drive portion 22, a camera 23, a microphone 24, a speaker 25, a robot communication portion 26, and a position identification portion 27.

The robot controller 21 performs the whole control of the mobile robot 20. The robot controller 21 includes a microcomputer including, for example, a CPU (not shown) and storage areas such as a ROM, a RAM, and a rewritable flash memory. The storage area (not shown) of the robot controller 21 stores a program for applying the mobile robot 20 to the monitoring system 1. Each of the drive portion 22, the camera 23, the microphone 24, the speaker 25, the robot communication portion 26, and the position identification portion 27 is electrically connected to the robot controller 21.

The drive portion 22 has a configuration for moving the mobile robot 20, and, in the case of the present embodiment, has a configuration including, for example, a motor for driving a wheel 221, an actuator (not shown) for steering the wheel 221, and the like. The drive portion 22 moves and turns the mobile robot 20 by rotating and steering the wheels 221 under the control of the robot controller 21.

The camera 23 has a function of capturing the surroundings of the mobile robot 20. In this case, the video that can be captured by the camera 23 may be any one of a moving image or a still image. The video captured by the camera 23 is transmitted to the system control apparatus 40 and stored in the system control apparatus 40 or transmitted to the monitoring terminal 30 via the system control apparatus 40. The mobile robot 20 may include an actuator for changing the orientation of the camera 23, that is, the capturing direction, or may have a configuration of changing the orientation of the camera 23 by changing the orientation of the mobile robot 20 itself.

The microphone 24 can collect sound around the mobile robot 20. The sound collected by the microphone 24 is converted into audio data to be transmitted to the system control apparatus 40 to be stored in the system control apparatus 40, or transmitted to the monitoring terminal 30 via the system control apparatus 40. The speaker 25 has a function of emitting sound to the surroundings of the mobile robot 20. The speaker 25 can emit sound generated inside the mobile robot 20, or sound based on audio data received from the monitoring terminal 30 via, for example, the system control apparatus 40.

The robot communication portion 26 is configured to be mutually communicable with the system control apparatus 40 by a wireless communication function using, for example, a wireless LAN or the like. The position identification portion 27 has a function of identifying the current position of the mobile robot 20 in the monitoring area 90. The position identification portion 27 can identify the current position of the mobile robot 20 by using a satellite positioning system such as a global positioning system (GPS), a short distance wireless communication system, or the like. In addition, the position identification portion 27 may identify the current position of the mobile robot 20 by reading a marker such as a two-dimensional code provided on, for example, a ceiling, a wall, a floor, or the like with the camera 23 or the like. In this case, the marker includes positional information on the place where the marker is provided.

In addition to the functions described above, the mobile robot 20 may include a sensor for measuring temperature, humidity, and illumination around the mobile robot 20, and furthermore, an acceleration sensor capable of measuring an impact applied to the mobile robot 20, and a motion sensor or the like capable of detecting the presence of the surrounding person. In addition, the mobile robot 20 incorporates a battery for supplying power necessary for the operation of the mobile robot 20. Then, when the remaining amount of the battery decreases, the mobile robot 20 automatically travels to the power feeding facility, and automatically connects to the power feeding facility to start charging.

The mobile robot 20 is configured to be switchable between an autonomous movement mode of being autonomously and automatically movable in the monitoring area 90 and a remote control mode of being movable by remote control from an external device such as the monitoring terminal 30. In the autonomous movement mode, as illustrated in FIG. 2, the mobile robot 20 autonomously moves on the patrol route R set in advance among the respective monitoring areas 91 to 97. It should be noted that in the present embodiment, autonomous movement of the mobile robot 20 means moving automatically without depending on the operation of a surveillance staff or the like. The external device indicates, for example, a device outside the monitoring terminal 30 or the mobile robot 20.

In order to achieve the autonomous movement mode, the patrol route R can be configured, for example, by an electrical or magnetic rail provided in advance over the monitoring areas 91 to 97. In this case, the robot controller 21 operates the drive portion 22 to move along the rails during the autonomous movement mode. In addition, the autonomous movement mode may be achieved as follows. That is, for example, markers are provided in a dotted manner on ceilings, walls, floors, and the like in the monitoring areas 91 to 97 instead of the electrical or magnetic rails. This marker is, for example, a two-dimensional code, or the like. Then, the robot controller 21 recognizes the marker based on the image acquired by the camera 23, thereby grasping the current position of the mobile robot 20, and causing the drive portion 22 to operate so that the mobile robot 20 moves along the marker.

Furthermore, the mobile robot 20 may be configured as follows. The map information, that is, the floor map in the facility or residence, about the specific area to be monitored may be stored, for example, in the storage area of the robot controller 21. Then, the robot controller 21 operates the drive portion 22 so that the mobile robot 20 moves based on the map information, and identifies the current position from the movement distance calculated based on the attitude of the mobile robot 20 and the number of rotations of the wheels 221. It should be noted that the mobile robot 20 is not limited to one that travels using the wheels 221 or the like, and may be, for example, a flight vehicle capable of autonomously flying.

In the present embodiment, as illustrated in FIG. 2, the patrol route R is set to a route of patrolling in the order of the corridor 92, dressing room 96, closet 95, dressing room 96, corridor 92, living room 94, corridor 92, bedroom 93, and corridor 92 again. In this case, the entrance 91 and the bathroom 97 are targets to be monitored, but the entrance 91 and the bathroom 97 include steps or the like, have relatively narrow areas, and can be photographed from other adjacent areas, so that the entrance 91 and the bathroom 97 are excluded from the patrol route R of the mobile robot 20. It should be noted that the entrance 91 and the bathroom 97 may be included in the patrol route R.

(Monitoring Terminal)

The monitoring terminal 30 has a function of presenting, to the surveillance staff, various information such as an abnormality detected by any one of the monitoring sensors 10, a video captured by the camera 23 of the mobile robot 20, and sound acquired by the microphone 24 of the mobile robot 20. Normally, the monitoring terminal 30 is installed in a place away from the building 90 to be monitored, such as a facility of a company that provides a service using the monitoring system 1.

The monitoring terminal 30 includes a terminal controller 31, a terminal communication portion 32, a microphone 33, a speaker 34, a display device 35, and an operation portion 36. The monitoring terminal 30 may be a computer dedicated to the monitoring system 1, or may be, for example, a general-purpose personal computer or a highly functional mobile terminal such as what is called a smartphone or a tablet terminal. The terminal controller 31 controls the entire monitoring terminal 30. The terminal controller 31 includes a microcomputer including, for example, a CPU (not shown) and storage areas such as a ROM, a RAM, and a rewritable flash memory. The storage area (not shown) of the terminal controller 31 stores a program for applying the monitoring terminal 30 to the monitoring system 1.

Each of the terminal communication portion 32, the microphone 33, the speaker 34, the display device 35, and the operation portion 36 is electrically connected to the terminal controller 31. The terminal communication portion 32 is configured to be connectable to the system control apparatus 40 by a communication function or the like using, for example, a telephone line or a wired or wireless LAN.

The microphone 33 has a function of collecting sound around the monitoring terminal 30. The sound collected by the microphone 33 is converted into audio data and transmitted to the mobile robot 20 via the system control apparatus 40. The speaker 34 has a function of emitting sound to the surroundings of the monitoring terminal 30. The speaker 34 can emit sound generated inside the monitoring terminal 30, or sound based on audio data received from the mobile robot 20 via the system control apparatus 40. Thus, the surveillance staff can talk with a person near the mobile robot 20 via the monitoring terminal 30.

The display device 35 is, for example, a general liquid crystal monitor or the like, and has a function of displaying a video captured by the camera 23 of the mobile robot 20. The operation portion 36 is used as an input device for remotely operating the mobile robot 20 when the mobile robot 20 is in the remote control mode. The operation portion 36 includes, for example, what is called a joystick, a cross key having buttons arranged in a cross direction, or the like and can input directions. In addition, when the display device 35 includes a touch panel, the operation portion 36 can also be configured by virtual buttons or the like displayed on the display device 35. Examples of the operation contents include switching between an autonomous movement mode and a remote control mode, determination of the movement speed and movement direction of the mobile robot 20 in the remote control mode, change in the direction of the camera 23, zoom in, and zoom out. The operation input into the operation portion 36 by the surveillance staff is transmitted to the mobile robot 20 via the system control apparatus 40.

(System Control Apparatus)

The system control apparatus 40 controls the operation contents of the monitoring sensors 10 and the mobile robot 20, and is also referred to as, for example, a home controller. The system control apparatus 40 monitors the alarm activation situation of each monitoring sensor 10, and monitors and controls the operation of the mobile robot 20. In addition, the system control apparatus 40 has a function of temporarily receiving alarm activation information from the monitoring sensors 10 and various information acquired by the mobile robot 20 and transmitting the information to the monitoring terminal 30 as needed to thereby determine the contents of the information displayed on the display device 35 of the monitoring terminal 30.

The system control apparatus 40 includes a system controller 41, a system communication portion 42, an alarm activation detector 43, a storage device 44, a monitoring area setting processor 45, a mode switching processor 46, a display permission processor 47, and a remote control processor 48. The system controller 41 controls the entire system control apparatus 40. The system controller 41 includes a microcomputer including, for example, a CPU (not shown) and storage areas such as a ROM, a RAM, and a rewritable flash memory. Each of the system communication portion 42, the alarm activation detector 43, and the storage device 44 is electrically connected to the system controller 41.

The system communication portion 42 is configured to be able to mutually communicate with each of the monitoring sensors 10, the mobile robot 20, and the monitoring terminal 30 with a communication function using, for example, a wired or wireless LAN. In addition, the system communication portion 42 also has a function of mediating mutual communication between the mobile robot 20 and the monitoring terminal 30. The communication between the monitoring sensor 10 and the system control apparatus 40 may be unidirectional from the monitoring sensor 10 to the system control apparatus 40.

When the monitoring sensor 10 detects an abnormality and activates an alarm of an abnormality signal, the alarm activation detector 43 detects alarm activation of the abnormality signal, and identifies the monitoring sensor 10 that activates an alarm of an abnormality signal. Thus, the alarm activation detector 43 can identify the monitoring area in which the abnormality occurs.

The storage device 44 includes a hard disk drive, a flash memory, and the like, and stores data such as video captured by the camera 23 of the mobile robot 20 and sound collected by the microphone 24 together with the acquisition date and time.

The monitoring area setting processor 45 can set which area of the monitoring target 90 is to be the monitoring area. In the case of the present embodiment, at least one monitoring sensor 10 is provided in each of all the areas 91 to 97 in the monitoring target 90. Then, the monitoring area setting processor 45 sets all the areas 91 to 97 in the building 90 as monitoring areas.

As illustrated in FIG. 3, the monitoring area setting processor 45 performs setting any one of the security priority area and the privacy priority area on each of the monitoring areas 91 to 97. The security priority area is an area where improvement in security has priority over privacy of the user. On the other hand, the privacy priority area is an area where privacy of the user has priority over improvement in security. To which of the security priority area and the privacy priority area each of the monitoring areas 91 to 97 is set depends on the user's option. In the case of the present embodiment, the entrance 91, the corridor 92, the bedroom 93, the living room 94, and the closet 95 are set as the security priority area. In addition, the dressing room 96 and the bathroom 97 are set as the privacy priority area.

The mode switching processor 46 performs switching processing between the autonomous movement mode and the remote control mode on the mobile robot 20 based on the alarm activation situation of the monitoring sensors 10 and the command from the monitoring terminal 30. In the present embodiment, when there is no alarm activation from each monitoring sensor 10, the mode switching processor 46 causes the mobile robot 20 to operate in the autonomous movement mode.

On the other hand, when detecting alarm activation from any one of the monitoring sensors 10 and satisfying a predetermined condition, the mode switching processor 46 notifies the monitoring terminal 30 that the mobile robot 20 can be switched to the remote control mode and permits the mobile robot 20 to switch to the remote control mode. Then, when the surveillance staff performs mode switching operation for switching the mobile robot 20 to the remote control mode using the operation portion 36 of the monitoring terminal 30, the monitoring terminal 30 transmits, to the system control apparatus 40, a switching signal for switching the mobile robot 20 to the remote control mode. Then, when receiving the switching signal from the monitoring terminal 30, the system control apparatus 40 switches the mobile robot 20 to the remote control mode. Thus, the surveillance staff can operate the operation portion 36 of the monitoring terminal 30 to remotely operate the mobile robot 20. It should be noted that in the case of the present embodiment, when there is no alarm activation of the monitoring sensors 10, the mode switching processor 46 inhibits the mobile robot 20 from switching to the remote control mode.

In the case of the present embodiment, when alarm activation of any one of the monitoring sensors 10 is detected and when the mobile robot 20 stays outside the privacy priority areas 96 and 97, that is, when the mobile robot 20 stays in any one of the security priority areas 91 to 95, the mode switching processor 46 permits the mobile robot 20 to switch to the remote control mode. On the other hand, even when alarm activation of any one of the monitoring sensors 10 is detected, when the mobile robot 20 stays in the privacy priority area 96 or 97, the mode switching processor 46 inhibits the mobile robot 20 from switching to the remote control mode, and causes the mobile robot 20 to maintain the autonomous movement mode. Then, in this case, the system control apparatus 40 causes the mobile robot 20 to autonomously move outside the privacy priority areas 96 and 97. Then, the mode switching processor 46 waits for the mobile robot 20 to move outside the privacy priority areas 96 and 97, and permits the mobile robot 20 to switch to the remote control mode.

The display permission processor 47 performs processing for determining whether to display a video captured by the camera 23 of the mobile robot 20 on the display device 35 of the monitoring terminal 30 in an unprocessed manner. In the present embodiment, "displaying in an unprocessed manner" means displaying part or whole of the video captured by the camera 23 in real time without performing processing such as modeling processing using, for example, what is called augmented reality (AR) technology, filling processing, mosaic processing, and color reversal processing. It should be noted that in this case, even if the display of the video is delayed by communication or the like, it is included in the concept of real time.

When the mobile robot 20 is switched to the remote control mode by detecting alarm activation of any one of the monitoring sensors 10, regarding videos in the security priority area 91 to 95, the display permission processor 47 permits the video captured by the camera 23 of the mobile robot 20 to be displayed on the display device 35 of the monitoring terminal 30 in an unprocessed manner. Then, the monitoring terminal 30 displays the unprocessed video on the display device 35 in accordance with the operation of the surveillance staff or the like. Thus, the surveillance staff can remotely operate the mobile robot 20 while seeing the video displayed on the display device 35, that is, the video around the mobile robot 20.

On the other hand, even when the mobile robot 20 is switched to the remote control mode by detecting alarm activation of any one of the monitoring sensors 10, regarding videos in the privacy priority area 96 and 97, the display permission processor 47 inhibits the video captured by the camera 23 of the mobile robot 20 from being displayed on the display device 35 of the monitoring terminal 30 in an unprocessed manner. In addition, when no alarm activation of the monitoring sensors 10 is detected or when the alarm activation of any one of the monitoring sensors 10 is detected but the mobile robot 20 is not switched to the remote control mode, regardless of whether the video captured by the camera 23 of the mobile robot 20 is a video in the security priority areas 91 to 95 or a video in the privacy priority areas 96 and 97, the display permission processor 47 inhibits the video from being displayed on the display device 35 of the monitoring terminal 30.

When the mobile robot 20 is in the remote control mode, the remote control processor 48 receives the operation input into the operation portion 36 of the monitoring terminal 30, and transmits the content of the operation to the mobile robot 20. In this case, the remote control processor 48 does not accept the operation of turning the camera 23 to the direction in which the privacy priority areas 96 and 97 enter the shooting range of the camera 23. That is, when the operation input into the operation portion 36 in the remote control mode is an operation of turning the camera 23 to the privacy priority areas 96 and 97 side, the remote control processor 48 prevents the mobile robot 20 from operating based on the content of the operation. Thus, the system control apparatus 40 inhibits the video in the privacy priority areas 96 and 97 from being displayed on the display device 35 in an unprocessed manner.

In the case of the present embodiment, a storage area (not shown) of the system controller 41 stores a program for the monitoring system. Then, the system controller 41 executes a program for the monitoring system in a CPU (not shown), thereby virtually achieving the monitoring area setting processor 45, the mode switching processor 46, the display permission processor 47, and the remote control processor 48 by software. It should be noted that the monitoring area setting processor 45, the mode switching processor 46, the display permission processor 47, and the remote control processor 48 may be achieved in hardware as an integrated circuit integrated with the system controller 41, for example.

(Operational Contents of Monitoring System)

Next, an example of control contents of the monitoring system 1 centered on the system control apparatus 40 will be described also with reference to FIG. 4 to FIG. 6. When starting the monitoring operation, the system control apparatus 40 cooperates with each monitoring sensor 10, the mobile robot 20, and the monitoring terminal 30 to execute the control contents illustrated in FIG. 4.

Figure 4:
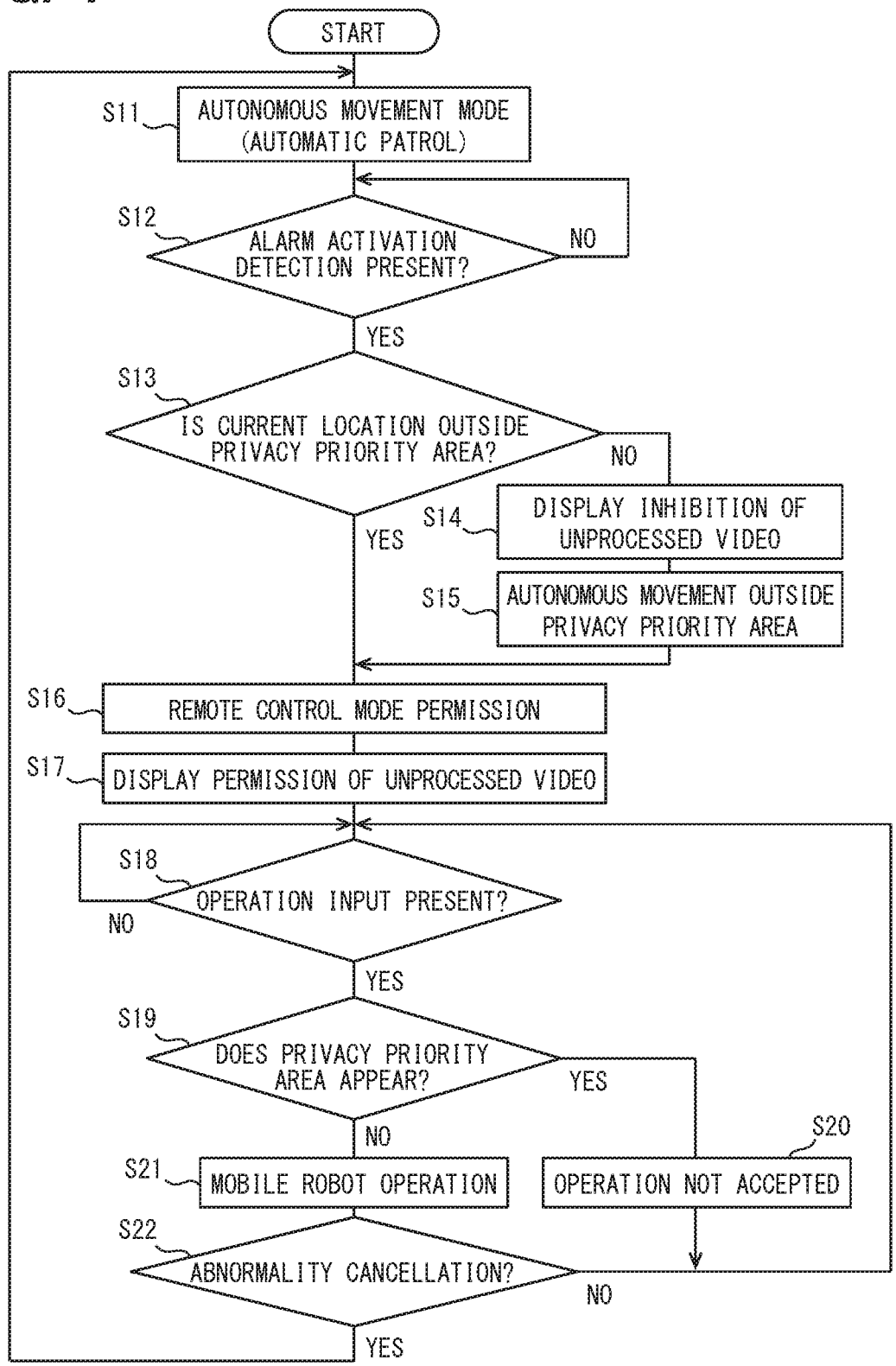
FIG. 4 is a diagram illustrating an example of control contents executed by the monitoring system according to the first embodiment.

If not detecting alarm activation of the monitoring sensors 10, the system control apparatus 40 determines that no abnormality occurs in the monitoring area 90, and sets the mobile robot 20 in the autonomous movement mode in S11 in FIG. 4. Thus, the mobile robot 20 patrols among the respective monitoring areas 91 to 97 along the patrol route R illustrated in FIG. 2. At this time, the mobile robot 20 may capture surrounding video with the camera 23 and acquire surrounding sound with the microphone 24. However, in this case, the acquired video and sound are stored in the storage device 44 of the system control apparatus 40, but are not transmitted to the monitoring terminal 30.

That is, the video and the sound acquired by the mobile robot 20 at the normal time when no abnormality occurs are not presented to the surveillance staff who operates the monitoring terminal 30 through the display device 35 and the speaker 34. Therefore, when the mobile robot 20 patrols in the autonomous movement mode, the surveillance staff cannot see the video captured by the camera 23 of the mobile robot 20 or listen to the sound acquired by the microphone 24. Thus, it may be possible to protect the privacy of the user residing in the monitoring area 90 in the autonomous movement mode.

The system control apparatus 40 causes the mobile robot 20 to operate in the autonomous movement mode until the system control apparatus 40 detects alarm activation from any one of the monitoring sensors 10 (NO in S12). When detecting the alarm activation from any one of the monitoring sensors 10 (YES in S12), the system control apparatus 40 determines that an abnormality occurs in any one of the monitoring areas 91 to 97. At this time, the system control apparatus 40 identifies a monitoring area in which the monitoring sensor 10 detecting the alarm activation is installed and transmits the result to the monitoring terminal 30. Then, the monitoring terminal 30 notifies the surveillance staff of the fact that the alarm activation is detected and the monitoring area in which the alarm activation is detected through the speaker 34 and the display device 35.

Figure 5:
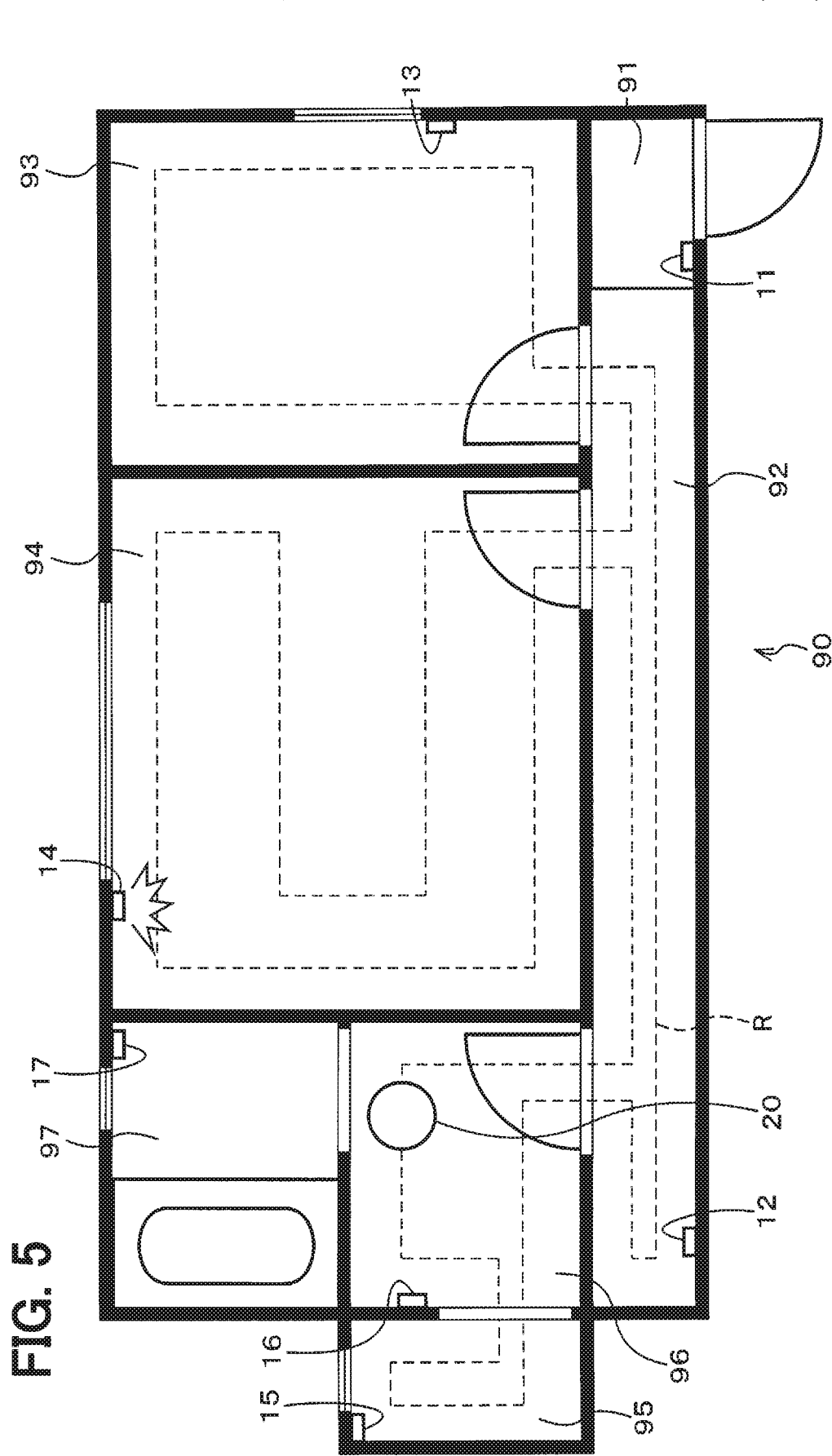
FIG. 5 is a diagram (No. 1) illustrating an example when a monitoring sensor activates an alarm in the monitoring system according to the first embodiment.

For example, as illustrated in FIG. 5, when the monitoring sensor 14 installed in the living room 94 detects an abnormality and activates an alarm, the system control apparatus 40 detects the alarm activation of the monitoring sensor 14 and determines that an abnormality occurs in the living room 94. Then, the system control apparatus 40 notifies the surveillance staff that the alarm activation of the monitoring sensor 14 installed in the living room 94 is detected, through the speaker 34 and the display device 35 of the monitoring terminal 30.

Next, in S13 in FIG. 4, the system control apparatus 40 acquires the current position of the mobile robot 20 patrolling in the autonomous movement mode and determines whether the current position is outside the privacy priority areas 96 and 97. For example, as illustrated in FIG. 5, in a case where the mobile robot 20 stays in the dressing room 96 being the privacy priority area when the monitoring sensor 14 activates an alarm (NO in S13 in FIG. 4), the system control apparatus 40 shifts the process to S14, and inhibits the video captured by the camera 23 of the mobile robot 20 from being displayed on the display device 35 in an unprocessed manner. In this case, the system control apparatus 40 controls the mobile robot 20 so that the mobile robot 20 does not capture a video with the camera 23, or even if a video is captured, the system control apparatus 40 does not transmit the video to the monitoring terminal 30, whereby the system control apparatus 40 inhibits the display of the unprocessed video. In addition, in this case, the system control apparatus 40 does not permit the remote control of the mobile robot 20.

Then, the system control apparatus 40 executes the processing in S15, and controls the mobile robot 20 so that the mobile robot 20 automatically moves outside the privacy priority areas 96 and 97. For example, as illustrated in FIG. 5 and FIG. 6, the system control apparatus 40 causes the mobile robot 20 to automatically move to the corridor 92 being the security priority area closest to the current location on the route from the dressing room 96 being the current position to the living room 94 being the alarm activation scene. At this time, the video captured by the camera 23 of the mobile robot 20 is not displayed on the display device 35 of the monitoring terminal 30. On the other hand, the sound acquired by the microphone 24 of the mobile robot 20 may be emitted from the speaker 34 of the monitoring terminal 30.

Figure 6:
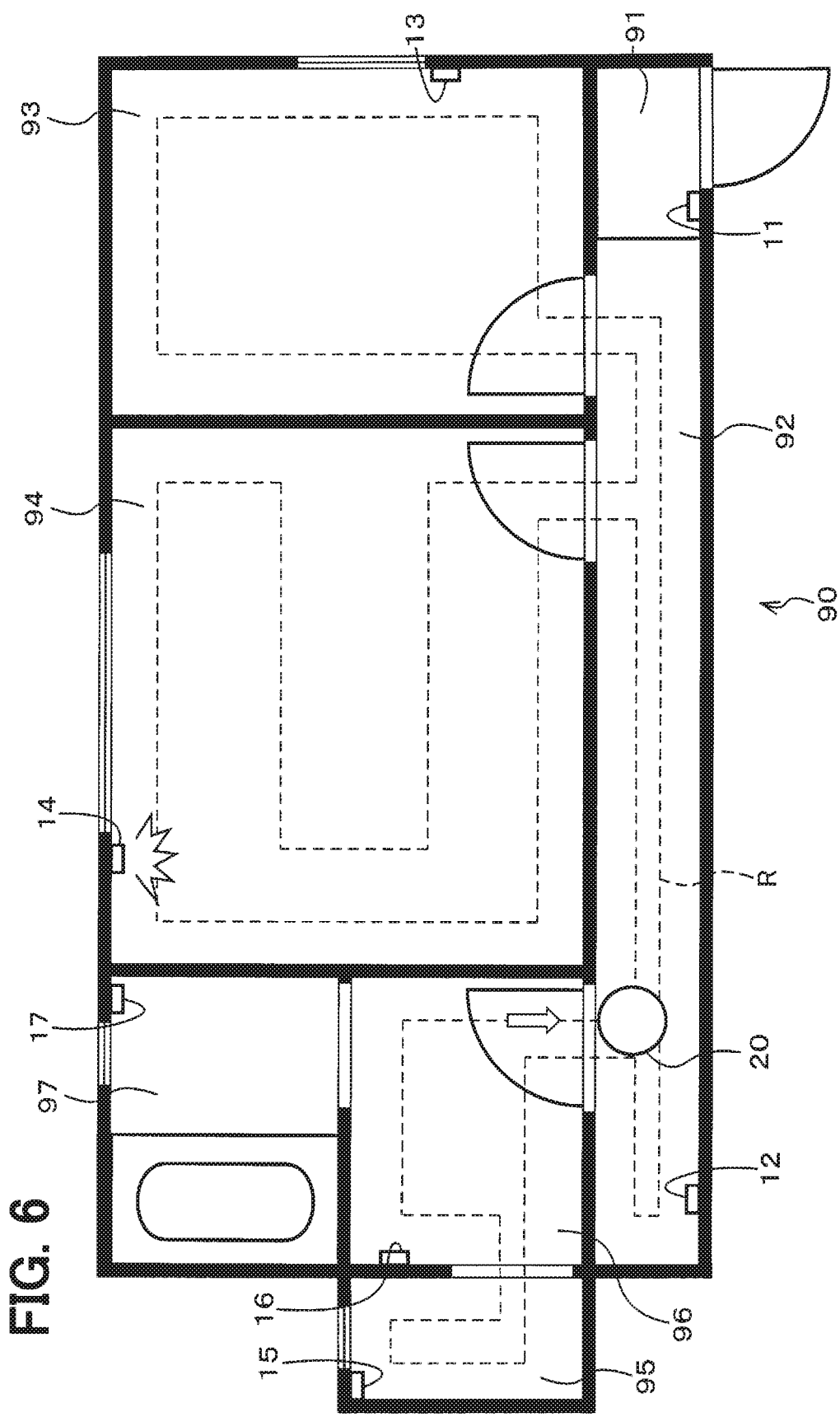
FIG. 6 is a diagram (No. 2) illustrating an example when a monitoring sensor activates an alarm in the monitoring system according to the first embodiment.

Then, when the mobile robot 20 moves outside the privacy priority areas 96 and 97, to the corridor 92 being the security priority area in the example in FIG. 6, the system control apparatus 40 executes the processing of S16 and S17 illustrated in FIG. 4. On the other hand, in a case where the mobile robot 20 stays outside the privacy priority areas 96 and 97 when alarm activation of any one of the monitoring sensors 10 is detected (YES in S13), the system control apparatus 40 executes the processing of S16 and S17 without executing the processing of S14 and S15 illustrated in FIG. 4.

In S16, the system control apparatus 40 permits the mobile robot 20 to switch to the remote control mode. In addition, in S17, the system control apparatus 40 permits the video captured by the camera 23 of the mobile robot 20 to be displayed on the display device 35 of the monitoring terminal 30 in an unprocessed state.

In this case, the system control apparatus 40 notifies the surveillance staff through the speaker 34 and the display device 35 of the monitoring terminal 30 that switching of the mobile robot 20 to the remote control mode is permitted and the display of the video captured by the camera 23 is permitted. Then, when the surveillance staff operates the monitoring terminal 30 to input operation of switching to the remote control mode, the system control apparatus 40 switches the mobile robot 20 to the remote control mode and causes the display device 35 of the monitoring terminal 30 to display the video captured by the camera 23 of the mobile robot 20 in an unprocessed state. When switched to the remote control mode, the mobile robot 20 is enabled to move on the outside of the patrol route R by the remote control of the surveillance staff.

Thereafter, in S18, the system control apparatus 40 determines whether the surveillance staff inputs the remote control into the operation portion 36 of the monitoring terminal 30. If there is no remote control input (NO in S18), the system control apparatus 40 causes the mobile robot 20 to stand by on the spot without operating. In addition, if there is an input of remote control by the surveillance staff (YES in S18), the system control apparatus 40 shifts the process to S19.

When the mobile robot 20 is operated by the operation input by the surveillance staff in S19, the system control apparatus 40 determines whether the privacy priority area 96 or 97 enters the shooting range of the camera 23, that is, whether the privacy priority area 96 or 97 appears in the camera 23. When the mobile robot 20 is operated by the operation input by the surveillance staff, if determining that the privacy priority area 96 or 97 enters the shooting range of the camera 23 (YES in S19), the system control apparatus 40 shifts the process to S20. Then, the system control apparatus 40 refuses to accept the operation and refuses to operate the mobile robot 20 based on the operation. Thus, the mobile robot 20 prevents the privacy priority area 96 or 97 from entering the shooting range of the camera 23. That is, thus, the display device 35 of the monitoring terminal 30 is prevented from displaying the unprocessed video of the privacy priority area 96 or 97. Thereafter, the system control apparatus 40 returns the process to S18 and waits for an input of remote control by the surveillance staff.

On the other hand, when the mobile robot 20 is operated by the operation input by the surveillance staff, if determining that the privacy priority area 96 or 97 does not enter the shooting range of the camera 23 in S19 (NO in S19), the system control apparatus 40 accepts the operation and shifts the process to S21. Then, in S21, the system control apparatus 40 transmits the content of the remote control input by the surveillance staff to the mobile robot 20, and causes the mobile robot 20 to operate based on the content of the operation.

The system control apparatus 40 repeats the processes of S18 to S21 until the processing of canceling the abnormality is performed. The processing of canceling the abnormality is performed by inputting an operation for canceling the abnormality into the monitoring terminal 30 when, for example, the surveillance staff checks through the mobile robot 20 that there is no abnormality or that the abnormality is eliminated. In addition, for example, when a coping staff himself who rushes to the scene checks that there is no abnormality or that the abnormality is eliminated, the processing of canceling the abnormality is performed by inputting an operation for canceling the abnormality into the mobile robot 20 or the system control apparatus 40. Then, if determining that the abnormality is cancelled (YES in S22), the system control apparatus 40 returns the process to S11, switches the mobile robot 20 to the autonomous movement mode again, and causes the mobile robot 20 to patrol on the patrol route R.

According to the embodiment described above, the monitoring system 1 includes the monitoring sensors 10, the mobile robot 20, the monitoring terminal 30, and the system control apparatus 40. The monitoring sensors 10 each are installed in each of the multiple monitoring areas 91 to 97. The mobile robot 20 includes a camera 23 capable of capturing a video around the mobile robot 20. In addition, the mobile robot 20 is configured to be switchable between an autonomous movement mode capable of autonomously moving among the monitoring areas 91 to 97 and a remote control mode capable of moving by remote control from the outside (in this case, the monitoring terminal 30). The monitoring terminal 30 includes a display device 35 capable of displaying a video captured by the camera 23 of the mobile robot 20, and an operation portion 36 used for remote control of the mobile robot 20 when the mobile robot 20 is in the remote control mode. The system control apparatus 40 switches between the autonomous movement mode and the remote control mode of the mobile robot 20 based on the alarm activation of any one of the monitoring sensors 10, and determines the manner of the video to be displayed on the display device 35.

The system control apparatus 40 sets security priority areas and privacy priority areas in advance to the monitoring areas 91 to 97. Then, when detecting alarm activation of any one of the monitoring sensors 10, the system control apparatus 40 permits the display device 35 to display a video in the security priority areas 91 to 95 in an unprocessed manner and inhibits the display device from displaying a video in the privacy priority areas 96 and 97 in an unprocessed manner, According to the configuration, when any one of the monitoring sensors 10 detects an abnormality, the surveillance staff can remotely operate the mobile robot 20 in the security priority areas 91 to 95 and see, in real time, the unprocessed video in the security priority areas 91 to 95 captured by the camera 23. Therefore, the surveillance staff can grasp the current situation in the security priority areas 91 to 95 quickly and accurately and can quickly take necessary measures such as causing a coping staff to head toward the scene. Thus, the security in the security priority areas 91 to 95 is improved.

On the other hand, the privacy priority areas 96 and 97 are areas where it is necessary to emphasize the privacy of the user residing in the monitoring area 90. Thus, according to the present embodiment, even when any one of the monitoring sensors 10 detects an abnormality, the surveillance staff cannot remotely operate the mobile robot 20 in the privacy priority areas 96 and 97 and cannot see, in real time, the unprocessed video in the privacy priority areas 96 and 97 captured by the camera 23. Thus, the privacy in the privacy priority areas 96 and 97 is protected. As described above, according to the monitoring system 1 of the present embodiment, it is possible to achieve both security improvement and privacy protection in the monitoring area 90.

In the present embodiment, in a case where the mobile robot 20 stays outside the privacy priority areas 96 and 97 when the system control apparatus 40 detects alarm activation of any one of the monitoring sensors 10, the system control apparatus 40 may permit the mobile robot 20 to switch to the remote control mode and may permit the display device 35 of the monitoring terminal 30 to display the video captured by the camera 23 in an unprocessed manner. On the other hand, in a case where the mobile robot 20 stays inside the privacy priority area 96 or 97 when the system control apparatus 40 detects alarm activation of any one of the monitoring sensors 10, the system control apparatus 40 inhibits the display device 35 of the monitoring terminal 30 from displaying the video captured by the camera 23 in an unprocessed manner. Then, the system control apparatus 40 causes the mobile robot 20 to autonomously move outside the privacy priority areas 96 and 97 with the display of the unprocessed video inhibited, thereafter, permits the mobile robot 20 to switch to the remote control mode, and permits the display device 35 to display a video captured by the camera 23 in an unprocessed manner.

According to this, even in a case where the mobile robot 20 stays in the privacy priority area 96 or 97 when any one of the monitoring sensors 10 detects an abnormality and activates an alarm, the mobile robot 20 automatically moves to the security priority areas 91 to 95 where remote control by the surveillance staff is allowed without the operation of the surveillance staff. At this time, the video in the privacy priority areas 96 and 97 is not displayed on the display device 35, so that the video in the privacy priority areas 96 and 97 is prevented from being viewed by the surveillance staff. As a result, it may be possible to further improve the operability of the mobile robot 20 by the surveillance staff. It may be possible to also improve the privacy protection of the user.

When the mobile robot 20 is in the remote control mode, the system control apparatus 40 inhibits the display device 35 of the monitoring terminal 30 from displaying a video about the inside of the privacy priority areas 96 and 97 in an unprocessed manner by not accepting the operation of turning the camera 23 to a direction in which the privacy priority areas 96 and 97 enter the shooting range of the camera 23.

According to this, even when the mobile robot 20 is in the remote control mode, the camera 23 of the mobile robot 20 cannot physically capture the inside of the privacy priority areas 96 and 97. Therefore, it may be possible to more reliably prevent the video in the privacy priority areas 96 and 97 from being viewed by the surveillance staff. As a result, it may be possible to more reliably protect the privacy of the user.

Second Embodiment

A second embodiment will be described with reference to FIG. 7 to FIG. 9.

The present embodiment is different from the first embodiment in the control from when the system control apparatus 40 detects alarm activation of any one of the monitoring sensors 10 until when the system control apparatus 40 permits the switching to the remote control mode. In this case, when detecting alarm activation of any one of the monitoring sensors 10, the system control apparatus 40 has a function of instructing the mobile robot 20 to automatically and autonomously move toward the monitoring area where the monitoring sensor 10 having detected the alarm activation is installed.

Figure 7:
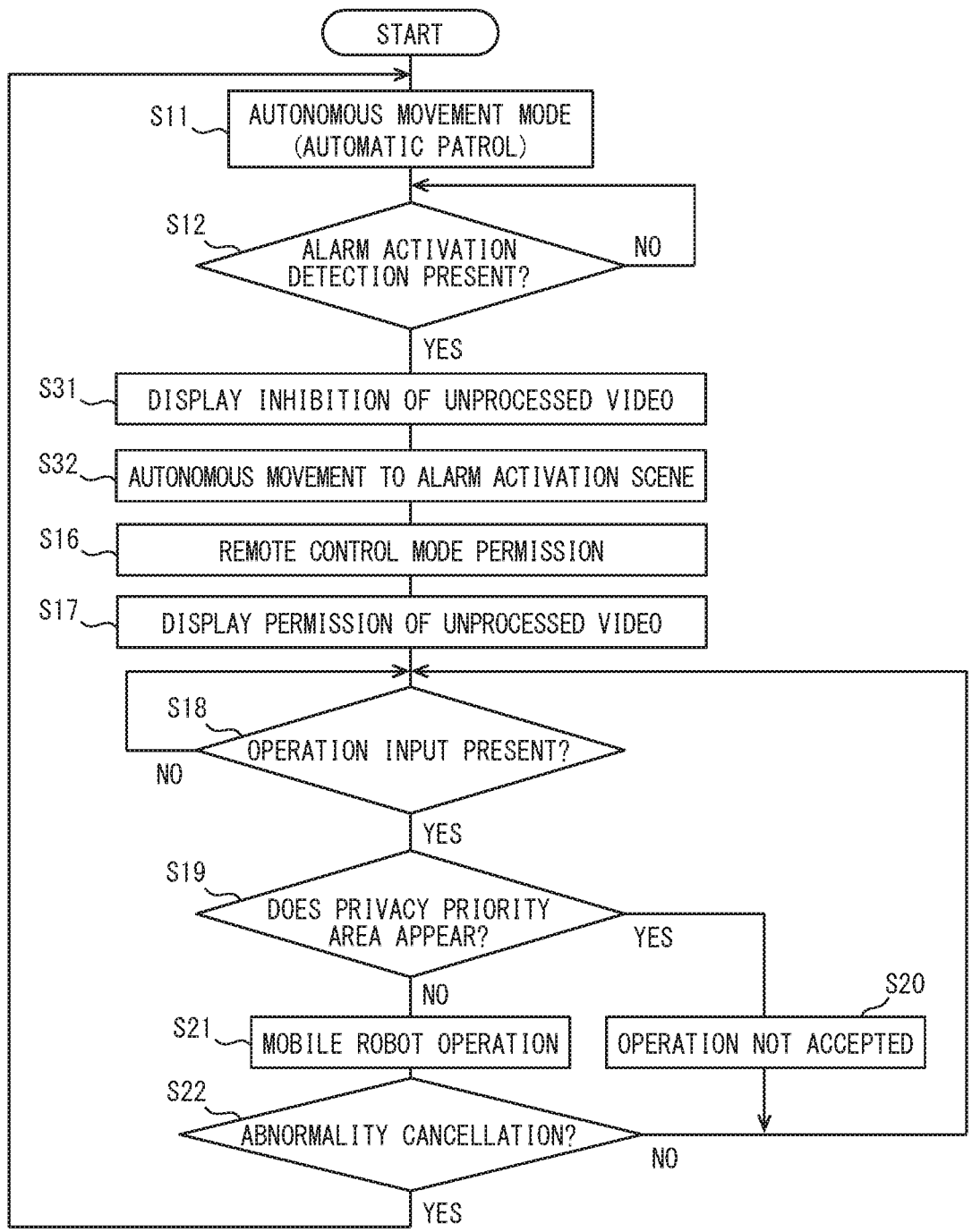
FIG. 7 is a diagram illustrating an example of control contents executed by a monitoring system according to a second embodiment.

That is, the system control apparatus 40 of the present embodiment executes the control flow illustrated in FIG. 7. In the control flow illustrated in FIG. 7, if detecting alarm activation of any one of the monitoring sensors 10 when the mobile robot 20 patrols and moves (YES in S12), the system control apparatus 40 shifts the process to S31, and inhibits the display device 35 from displaying the video captured by the camera 23 of the mobile robot 20 in an unprocessed manner similarly to S14 in FIG. 4.

Next, the system control apparatus 40 shifts the process to S32, identifies the installation location of the monitoring sensor 10 having activated the alarm and instructs the mobile robot 20 to move toward the installation location of the monitoring sensor 10 having activated the alarm. Thus, the mobile robot 20 automatically and autonomously moves to the monitoring area where the monitoring sensor 10 whose alarm activation is detected is installed. Thereafter, the system control apparatus 40 executes the processes in and after S16, and as in the first embodiment, permits the mobile robot 20 to switch to the remote control mode and permits the display device 35 to display the unprocessed video.

Figure 8:
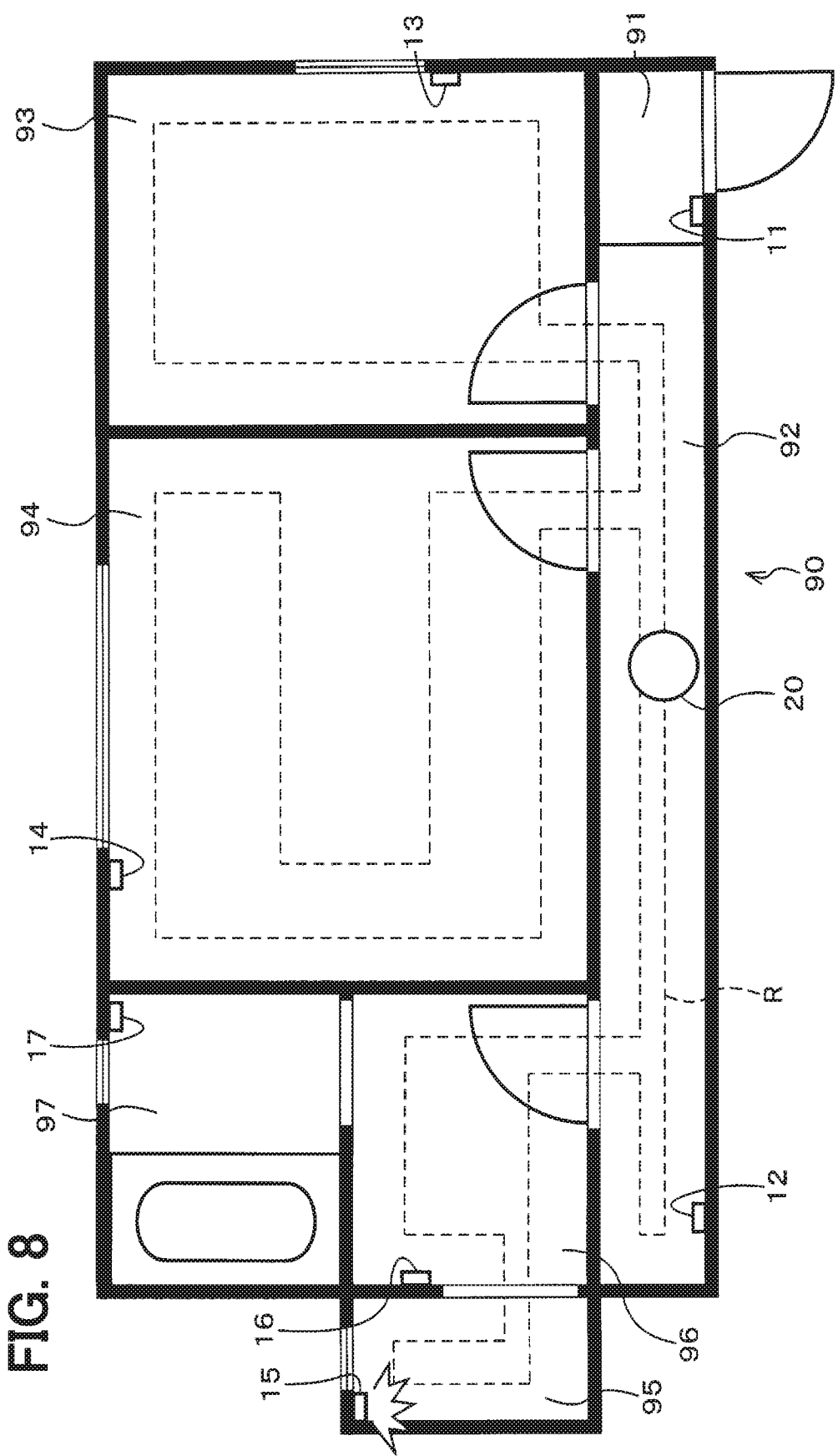
FIG. 8 is a diagram (No. 1) illustrating an example when a monitoring sensor activates an alarm in the monitoring system according to the second embodiment.
Figure 9:
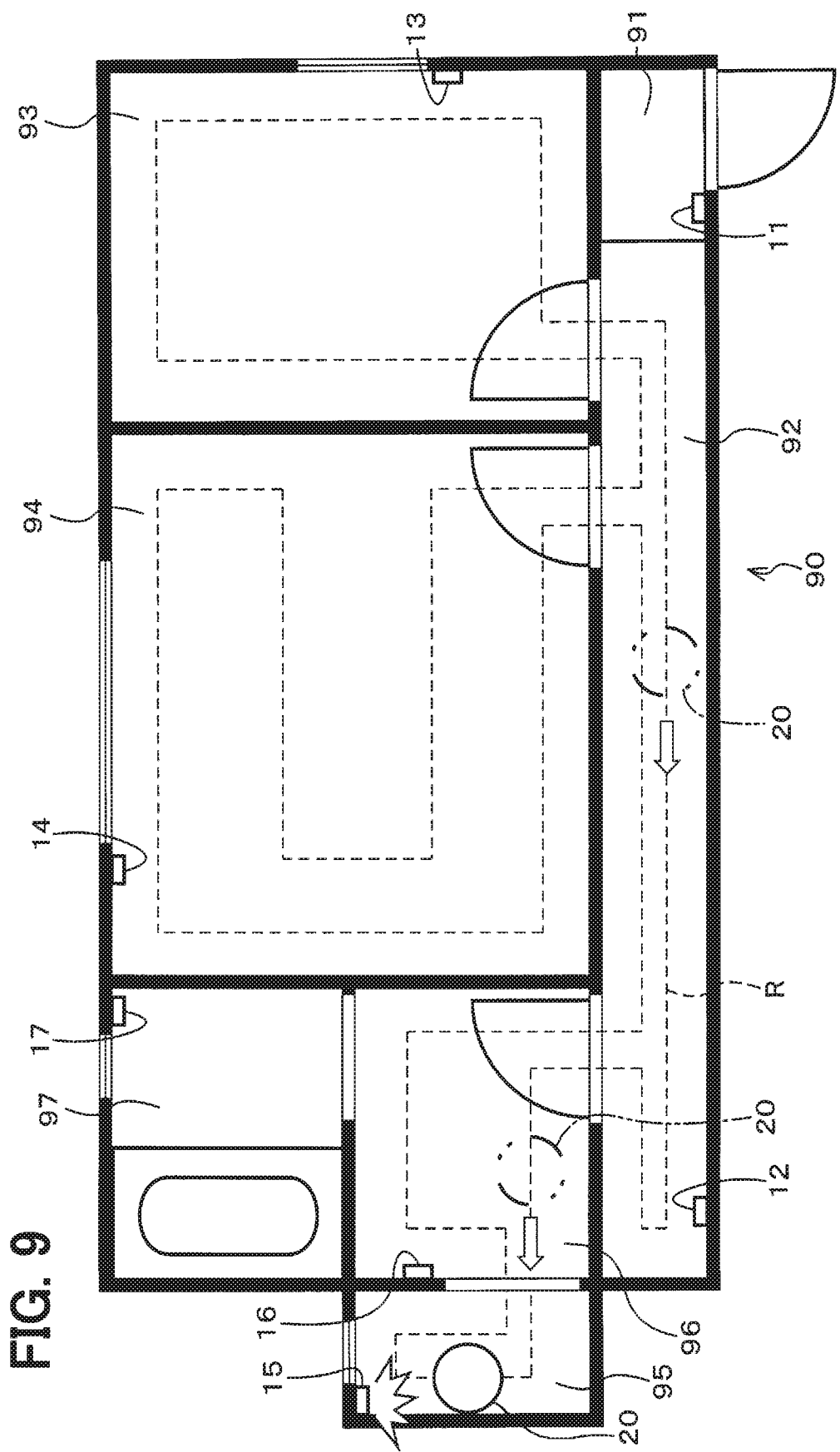
FIG. 9 is a diagram (No. 2) illustrating an example when a monitoring sensor activates an alarm in the monitoring system according to the second embodiment.
Figure 10:
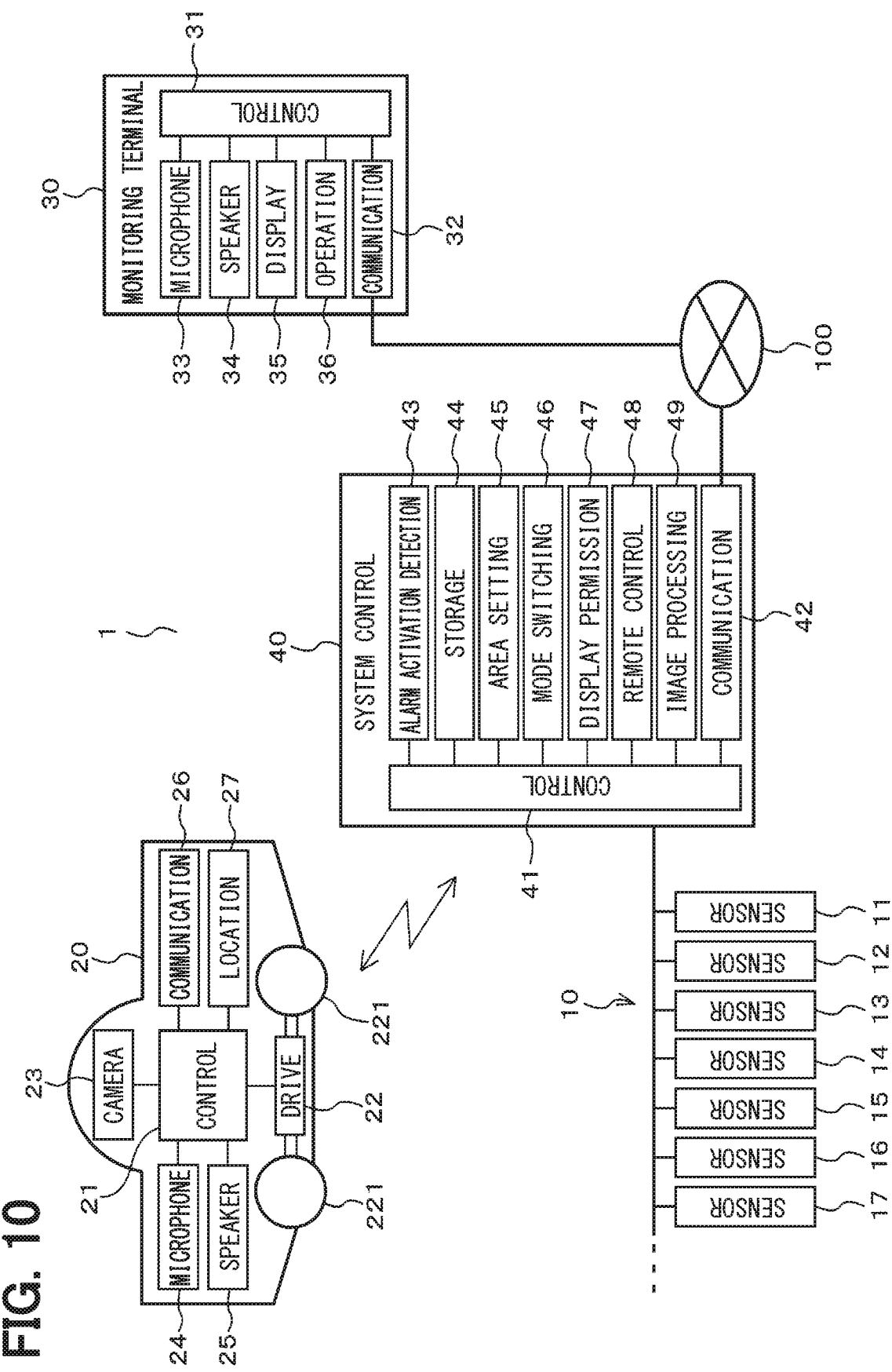
FIG. 10 is a block diagram conceptually illustrating an example of an electrical configuration of a monitoring system according to a third embodiment.

In this case, for example, as illustrated in FIG. 8, the case where the monitoring sensor 15 installed in the closet 95 activates an alarm when the mobile robot 20 stays in the corridor 92 will be described. In this case, first, the system control apparatus 40 causes the mobile robot 20 to autonomously move to the closet 95 being the alarm activation scene without permitting the mobile robot 20 to switch to the remote control mode. At this time, the system control apparatus 40 inhibits the display device 35 from displaying the video captured by the camera 23 of the mobile robot 20 in an unprocessed manner. Then, as illustrated in FIG. 9, when the mobile robot 20 automatically and autonomously moves to the closet 95, the system control apparatus 40 permits the mobile robot 20 to switch to the remote control mode and permits the display device 35 of the monitoring terminal 30 to display the video captured by the camera 23 of the mobile robot 20 in an unprocessed state.

Thus, in the present embodiment, when detecting alarm activation of any one of the monitoring sensors 10, the system control apparatus 40 causes the mobile robot 20 to autonomously move to the monitoring area where the monitoring sensor 10 whose alarm activation is detected is installed, and then allows the mobile robot 20 to switch to the remote control mode and permits the display device 35 of the monitoring terminal 30 to display the video captured by the camera 23 of the mobile robot 20 in an unprocessed manner.

According to this, since the mobile robot 20 automatically moves to the scene where the abnormality is detected, there is no need for the surveillance staff to perform remote control when causing the mobile robot 20 to head toward the scene. Therefore, the botheration due to the remote control is reduced and the convenience is improved. In addition, when causing the mobile robot 20 to head toward the scene of the alarm activation, if the surveillance staff performs remote control, the surveillance staff may dither over the route and it may take time for the mobile robot 20 to arrive at the scene. On the other hand, according to the present embodiment, since the mobile robot 20 automatically rushes to the scene where the abnormality is detected, the mobile robot 20 can arrive at the scene immediately after the alarm activation of the monitoring sensor 10 is detected. Therefore, the surveillance staff can quickly check the situation at the scene. As a result, it may be possible to further improve security in the monitoring area 90.

Furthermore, in this case, even when the privacy priority areas 96 and 97 exist in the middle of the route on which the mobile robot 20 heads to the alarm activation scene of the monitoring sensor 10, that is, even when the mobile robot 20 passes through the dressing room 96, for example, as illustrated in FIG. 8, the surveillance staff cannot remotely operate the mobile robot 20 until the mobile robot 20 passes through the dressing room 96 and reaches the closet 95. In addition, in this case, since the video in the privacy priority areas 96 and 97 is not displayed on the display device 35, the surveillance staff cannot see the unprocessed video in the privacy priority areas 96 and 97 captured by the camera 23 in real time. Thus, the video in the privacy priority areas 96 and 97 is prevented from being seen by the surveillance staff. As described above, also according to the present embodiment, it is possible to achieve both security improvement and privacy protection in the monitoring area 90.

Third Embodiment

A third embodiment will be described with reference to FIG. 10 to FIG. 16.

The present embodiment is different from the first embodiment and the second embodiment in the method of inhibiting the display of the unprocessed video in the privacy priority areas 96 and 97. That is, when detecting alarm activation of any one of the monitoring sensors 10, the system control apparatus 40 of the present embodiment permits the mobile robot 20 to switch to the remote control mode regardless of the area in which the mobile robot 20 stays.

Then, when the mobile robot 20 is switched to the remote control mode, if the privacy priority areas 96 and 97 do not appear in the video captured by the camera 23 of the mobile robot 20, the system control apparatus 40 permits the display device 35 of the monitoring terminal 30 to display the video as it is unprocessed. On the other hand, for example, as illustrated in FIG. 12, when the privacy priority areas 96 and 97 appear in the video captured by the camera 23 of the mobile robot 20, the system control apparatus 40 inhibits the display device 35 from displaying the unprocessed video illustrated in FIG. 12.

Figure 12:
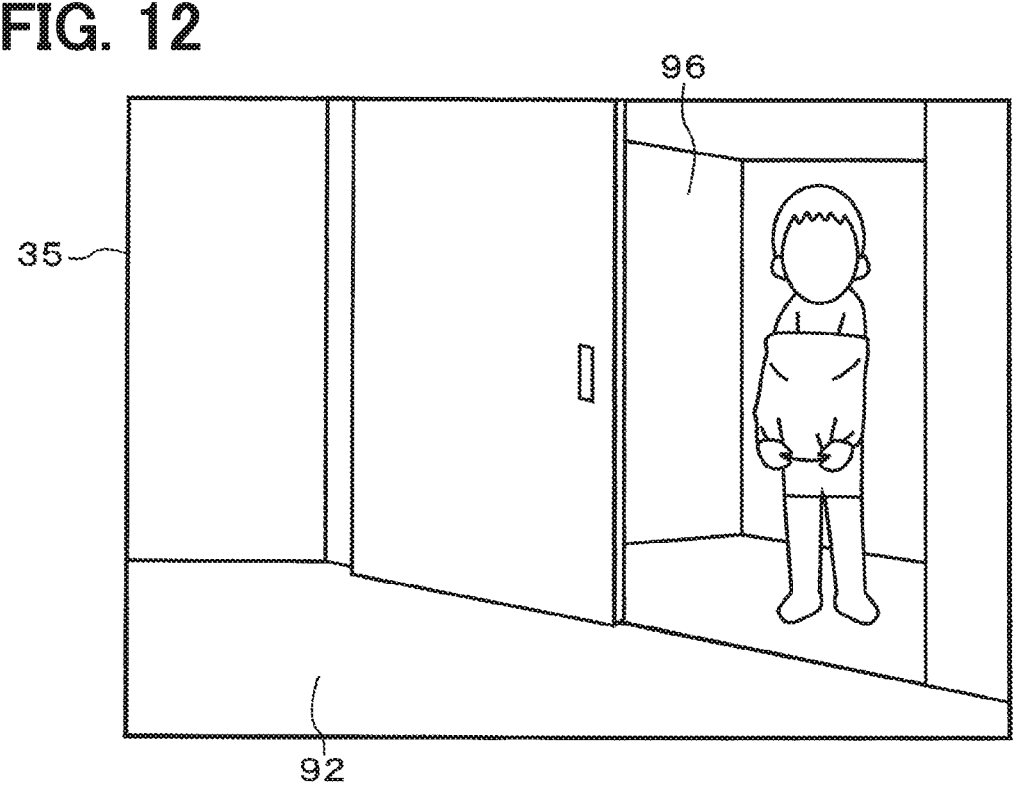
FIG. 12 is a diagram illustrating an example of an unprocessed video when a privacy priority area appears in a video captured by a camera in the monitoring system according to the third embodiment.
Figure 13:
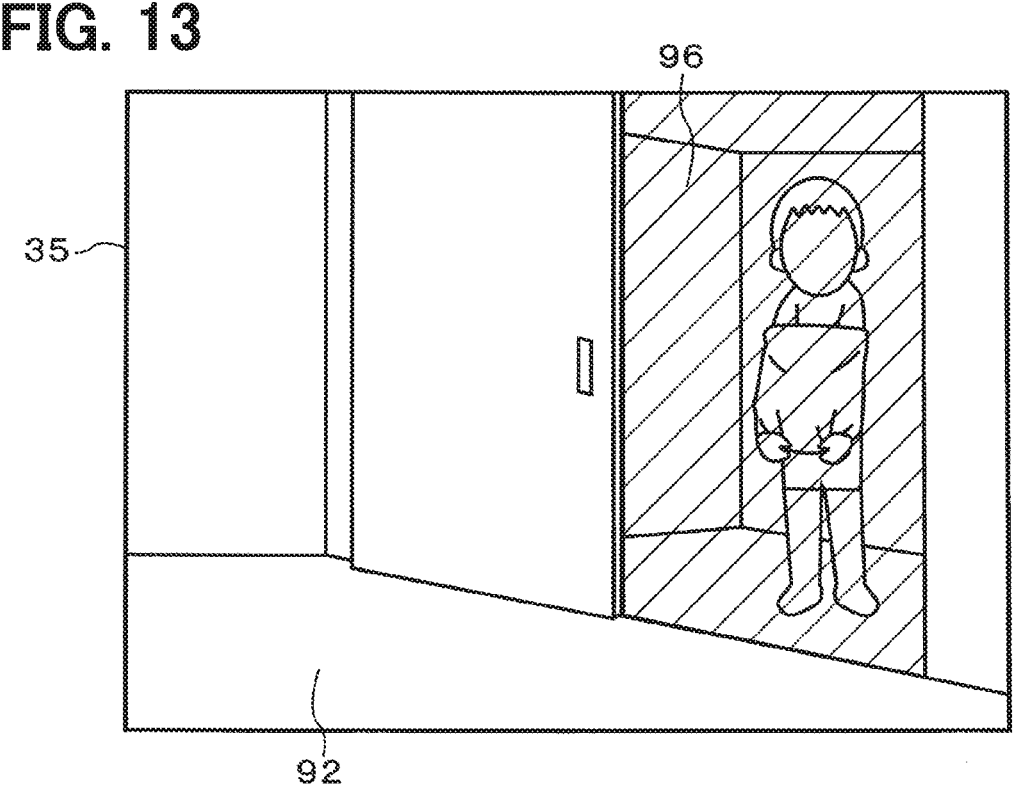
FIG. 13 is a diagram illustrating by hatching the privacy priority area in FIG. 12 in the monitoring system according to the third embodiment.

FIG. 12 illustrates an example of a video captured by the camera 23 of the mobile robot 20 as it is, that is, an example of an unprocessed video, and FIG. 13 illustrates by hatching and distinguishes the range of the dressing room 96 being the privacy priority area out of FIG. 12.

Figure 14:
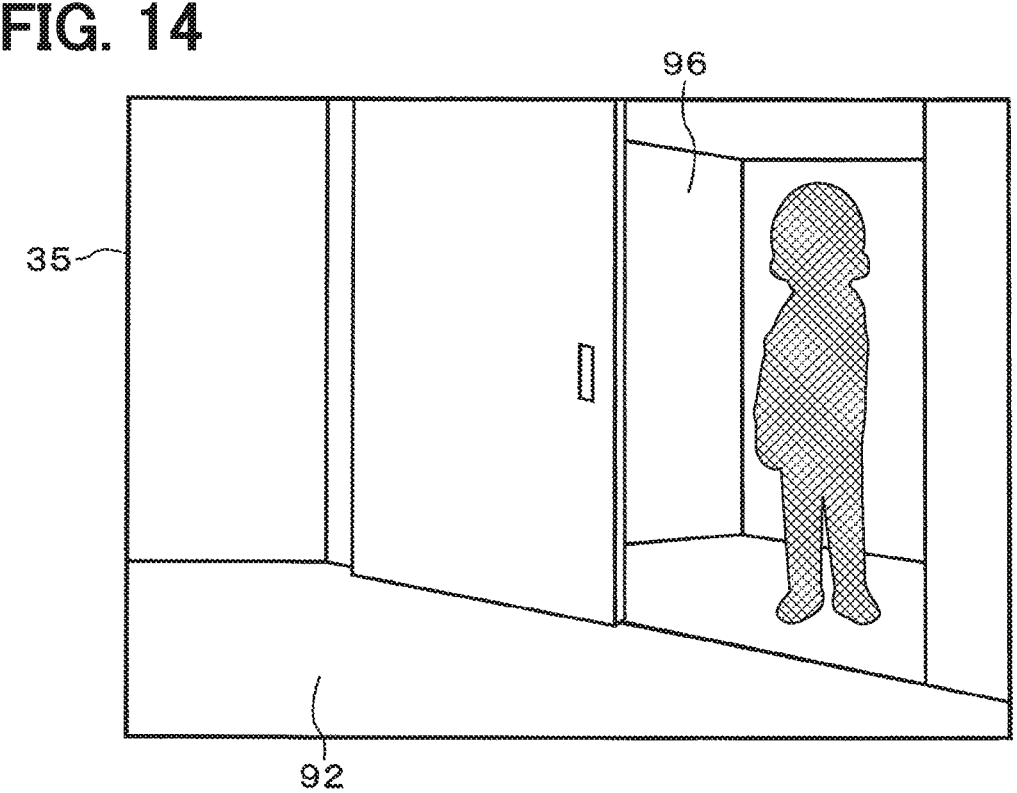
FIG. 14 is a diagram illustrating an example of a processed video obtained by performing modeling processing on a person in the privacy priority area as an example of video processing when the privacy priority area appears in the video captured by the camera in the monitoring system according to the third embodiment.
Figure 15:
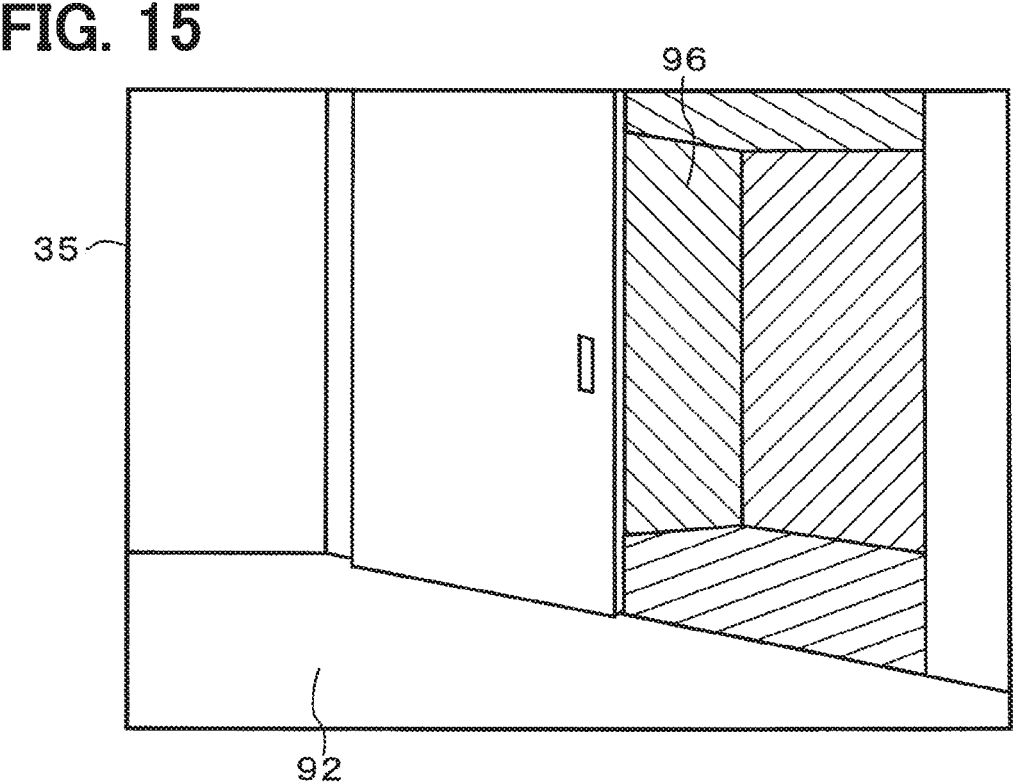
FIG. 15 is a diagram illustrating an example of a processed video obtained by performing modeling processing on a background in the privacy priority area as an example of video processing when the privacy priority area appears in the video captured by the camera in the monitoring system according to the third embodiment.
Figure 16:
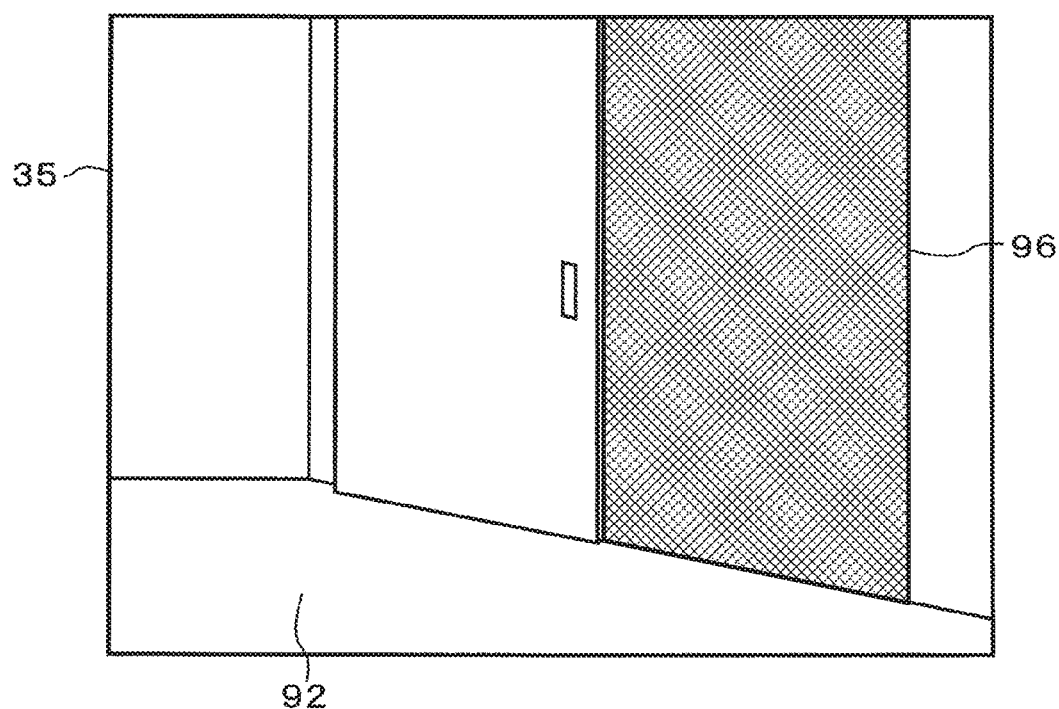
FIG. 16 is a diagram illustrating an example of a processed video subjected to filling processing as an example of video processing when the privacy priority area appears in the video captured by the camera in the monitoring system according to the third embodiment.

Then, as illustrated in FIG. 14 to FIG. 16, the system control apparatus 40 causes the display device 35 of the monitoring terminal 30 to display the processed video obtained by performing video processing on the video captured by the camera 23. In this case, the video processing is performed for preventing the individual of the person staying in the privacy priority areas 96 and 97 from being identified.

For example, FIG. 14 is an example illustrating a human model display of two-dimensionally or three-dimensionally modeling and displaying a person in the privacy priority area 96. In this case, the person shown filled in black is what is called a virtual video subjected to the video processing, and a portion other than the person is what is called a real video not subjected to the video processing. It should be noted that in the drawing, the portion filled in black is displayed as cross hatching.

For example, FIG. 15 is an example illustrating a background model display in which the person in the privacy priority area 96 is erased and the surrounding background is 2D or 3D modeled and displayed as indicated by the hatched portion. In this case, the privacy priority area 96 indicated by hatching is what is called a virtual video subjected to the video processing, and the portion other than the privacy priority area 96 indicated by hatching is what is called a real video not subjected to the video processing.

Then, for example, FIG. 16 is an example illustrating a filled display in which the entire privacy priority area 96 is filled in a specific color and displayed. In this case, the privacy priority area 96 indicated by being filled in black is what is called a virtual video subjected to the video processing, and the portion other than the privacy priority area 96 indicated by being filled in black is what is called a real video not subjected to the video processing. Furthermore, examples of the video processing include mosaic processing for applying mosaic to a person in the privacy priority area 96 included in the video captured by the camera 23 or to the entire privacy priority area 96, and color reversal processing for reversing colors.

Figure 11:
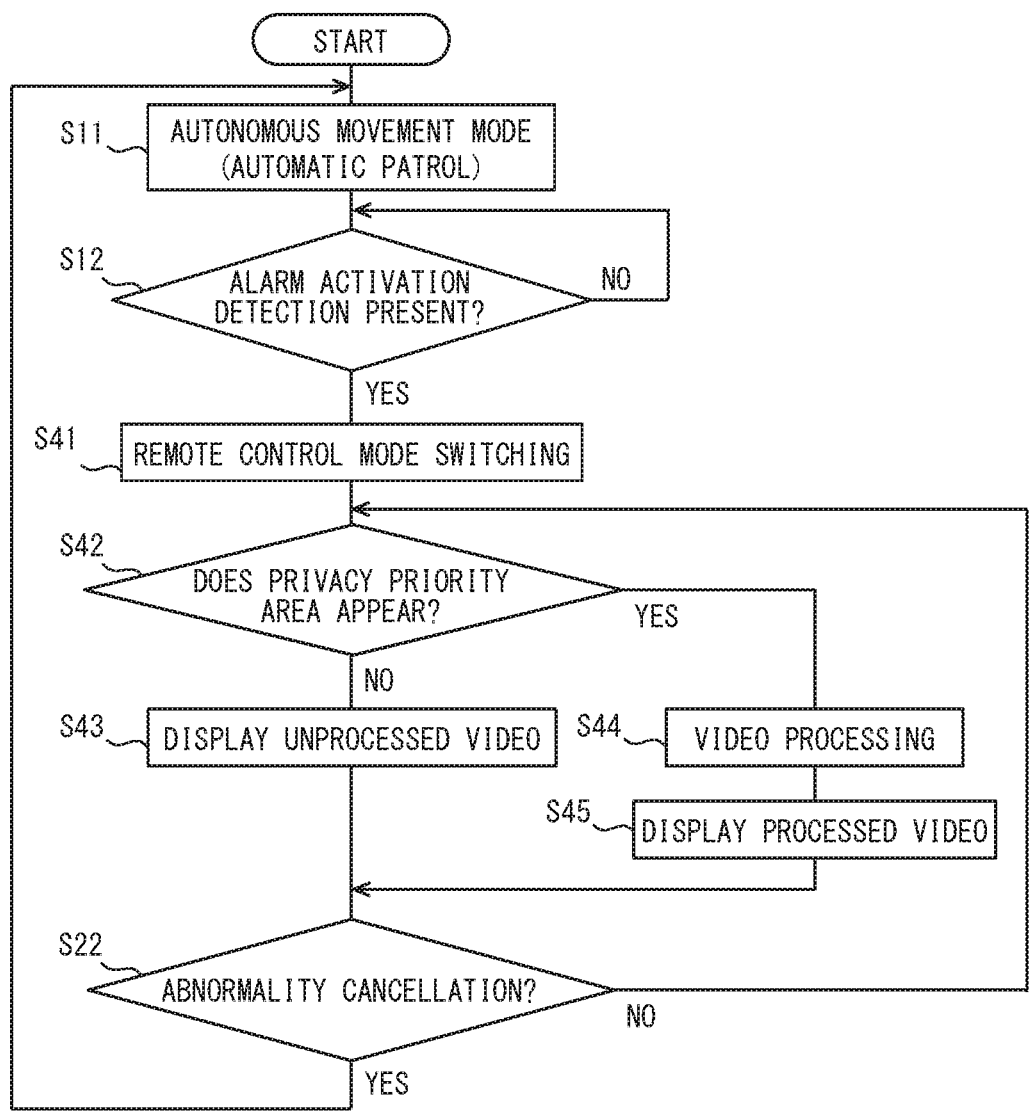
FIG. 11 is a diagram illustrating an example of control contents executed by the monitoring system according to the third embodiment.

The system control apparatus 40 executes, for example, control contents illustrated in FIG. 11. If detecting alarm activation of the monitoring sensor 10 during the automatic patrol in S11 (YES in S12), the system control apparatus 40 shifts the process to S41 and switches the mobile robot 20 to the remote control mode. Then, in S42, the system control apparatus 40 determines whether the privacy priority areas 96 and 97 appear in the video captured by the camera 23 of the mobile robot 20.

The determination as to whether the privacy priority areas 96 and 97 appear in the video captured by the camera 23 may be made, for example, from the current position and attitude of the mobile robot 20, or may be made, for example, by providing a marker for identifying the type of area at the boundary of each area and reading the marker with the camera 23.

If the privacy priority areas 96 and 97 do not appear in the video captured by the camera 23 (NO in S42), the system control apparatus 40 shifts the process to S43 and causes the display device 35 of the monitoring terminal 30 to display the unprocessed video. On the other hand, if the privacy priority areas 96 and 97 appear in the video captured by the camera 23 (YES in S42), the system control apparatus 40 shifts the process to S44, and as illustrated in FIG. 14 to FIG. 16, performs video processing on the captured video. Then, the system control apparatus 40 shifts the process to S45, and causes the display device 35 of the monitoring terminal 30 to display the processed video subjected to the video processing. Thereafter, as in the above embodiment, in S22, the system control apparatus 40 determines whether the abnormal state is canceled.

Thus, in the present embodiment, when the privacy priority areas 96 and 97 appear in the video captured by the camera 23 of the mobile robot 20, the system control apparatus 40 causes the display device 35 to display a processed video subjected to such video processing that at least an individual of a person appearing in the video cannot be identified.

According to this, when remotely operating the mobile robot 20, the surveillance staff can remotely operate the mobile robot 20 while grasping the situation around the mobile robot 20 by seeing the video displayed on the display device 35 of the monitoring terminal 30, but cannot identify an individual of a person staying in the privacy priority areas 96 and 97. Therefore, the operability of the mobile robot 20 by the surveillance staff is improved, the security in the monitoring area 90 is improved, and the privacy of the user can also be protected.

What is claimed is:

1. A monitoring system comprising:
   a monitoring sensor that is placed at each of a plurality of monitoring areas;
   a mobile robot that includes a camera configured to capture a video around the mobile robot, the mobile robot being configured to switch between an autonomous movement mode capable of autonomously moving among the monitoring areas and a remote control mode capable of moving by a remote control from an outside;
   a monitoring terminal that includes
     a display device configured to display the video captured by the camera of the mobile robot, and
     an operation portion for the remote control of the mobile robot when the mobile robot is in the remote control mode; and
   a system control apparatus that is configured to switch between the autonomous movement mode and the remote control mode of the mobile robot based on an alarm activation of the monitoring sensor and that is configured to determine a manner of a video to be displayed on the display device,
   wherein:
     a security priority area and a privacy priority area are set in advance in the monitoring areas; and
     in response to that the system control apparatus detects the alarm activation of the monitoring sensor, the system control apparatus permits the display device to display a video in the security priority area in an unprocessed manner and inhibits the display device from displaying a video in the privacy priority area in the unprocessed manner.

2. The monitoring system according to claim 1, wherein:
   in a case where the mobile robot stays outside the privacy priority area when the system control apparatus detects the alarm activation of the monitoring sensor, the system control apparatus permits the mobile robot to switch to the remote control mode and permits the display device to display the video captured by the camera in the unprocessed manner; and
   in a case where the mobile robot stays inside the privacy priority area when the system control apparatus detects the alarm activation of the monitoring sensor, the system control apparatus causes the mobile robot to autonomously move outside the privacy priority area while inhibiting the display device from displaying the video captured by the camera in the unprocessed manner, and then permits the mobile robot to switch to the remote control mode.

3. The monitoring system according to claim 1, wherein:
   in response to that the mobile robot is in the remote control mode, the system control apparatus inhibits the display device from displaying a video about an inside of the privacy priority area in the unprocessed manner without accepting operation of turning the camera to a direction in which the privacy priority area enters a shooting range of the camera.

4. The monitoring system according to claim 1, wherein:
   in response to detection of the alarm activation of the monitoring sensor, the system control apparatus causes the mobile robot to autonomously move to a monitoring area at which the monitoring sensor whose alarm activation is detected is placed, and then allows the mobile robot to switch to the remote control mode and permits the display device to display the video captured by the camera in the unprocessed manner.

5. The monitoring system according to claim 1, wherein:
   in response to that the privacy priority area appears in the video captured by the camera, the system control apparatus causes the display device to display a processed video subjected to a video processing such that an individual of a person appearing in the video is prevented from at least being identified.

* * * * *